US012664745B2

(12) United States Patent
Sharma et al.

(10) Patent No.: US 12,664,745 B2
(45) Date of Patent: Jun. 23, 2026

(54) INFORMATION PROCESSING APPARATUS AND INFORMATION PROCESSING METHOD

(71) Applicant: SONY GROUP CORPORATION, Tokyo (JP)

(72) Inventors: Ankit Sharma, Tokyo (JP); Natsuki Fukuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 95 days.

(21) Appl. No.: 18/559,591

(22) PCT Filed: Jan. 24, 2022

(86) PCT No.: PCT/JP2022/002349
§ 371 (c)(1),
(2) Date: Nov. 8, 2023

(87) PCT Pub. No.: WO2022/249539
PCT Pub. Date: Dec. 1, 2022

(65) Prior Publication Data
US 2024/0378833 A1 Nov. 14, 2024

(30) Foreign Application Priority Data

May 26, 2021 (JP) ................................. 2021-088407

(51) Int. Cl.
*G06T 19/20* (2011.01)
*G06T 7/246* (2017.01)
(Continued)

(52) U.S. Cl.
CPC .............. *G06T 19/20* (2013.01); *G06T 7/246* (2017.01); *G06T 7/73* (2017.01); *G06T 19/006* (2013.01);
(Continued)

(58) Field of Classification Search
None
See application file for complete search history.

(56) References Cited

U.S. PATENT DOCUMENTS

| | | | |
|---|---|---|---|
| 10,515,459 B2 * | 12/2019 | Uchiyama | ................. G06T 7/80 |
| 2007/0146370 A1 * | 6/2007 | Gordon | ................... G06T 7/246 |
| | | | 345/474 |

(Continued)

FOREIGN PATENT DOCUMENTS

| | | |
|---|---|---|
| JP | 2009-545083 A | 12/2009 |
| JP | 2011-107877 A | 6/2011 |

(Continued)

OTHER PUBLICATIONS

International Search Report and Written Opinion of PCT Application No. PCT/JP2022/002349, issued on Mar. 1, 2022, 08 pages of ISRWO.

(Continued)

*Primary Examiner* — Ryan M Gray
(74) *Attorney, Agent, or Firm* — CHIP LAW GROUP

(57) ABSTRACT

Provided is an information processing apparatus including a display control unit and a fitting unit. The display control unit displays a distribution image indicating distribution of a plurality of marker points extracted from a face model of a performer in a superimposed manner on a face image of the performer. The fitting unit fits the face model to the face image by using position information of a placed marker each time the marker is placed on a face of the performer after the distribution image is superimposed, and adjusts a superimposed position of the distribution image based on a fitting result.

16 Claims, 16 Drawing Sheets

(51) Int. Cl.
    *G06T 7/73*         (2017.01)
    *G06T 19/00*       (2011.01)

(52) U.S. Cl.
    CPC ............... *G06T 2207/10016* (2013.01); *G06T 2207/30201* (2013.01); *G06T 2207/30204* (2013.01); *G06T 2219/2004* (2013.01)

(56)         References Cited

U.S. PATENT DOCUMENTS

| | | | |
|---|---|---|---|
| 2008/0025569 A1* | 1/2008 | Gordon | G06V 40/161 |
| | | | 382/103 |
| 2009/0066700 A1* | 3/2009 | Harding | G06T 13/40 |
| | | | 345/473 |
| 2010/0302258 A1* | 12/2010 | Epps | G06T 13/40 |
| | | | 345/474 |
| 2011/0025853 A1* | 2/2011 | Richardson | H04N 23/66 |
| | | | 348/E7.085 |
| 2018/0025506 A1 | 1/2018 | Li et al. | |
| 2018/0047184 A1* | 2/2018 | Uchiyama | G06T 7/80 |
| 2020/0034606 A1* | 1/2020 | Sipolins | G06F 3/015 |
| 2020/0082625 A1* | 3/2020 | Bastide | H04L 67/131 |
| 2023/0079478 A1* | 3/2023 | Hodges | G06T 19/20 |
| | | | 345/419 |

FOREIGN PATENT DOCUMENTS

| | | |
|---|---|---|
| JP | 2011-238291 A | 11/2011 |
| JP | 2013-054761 A | 3/2013 |

OTHER PUBLICATIONS

"Weta Digital's Face Pipeline: Alita Battle Angel", Polygo Notes, Mar. 12, 2019, 9 pages.

Arun, et al., "Least-square fitting of two 3-D point sets", IEEE Transactions on Pattern Analysis and Machine Intelligence, vol. PAMI-9, Issue: 5, Sep. 1987, pp. 698-700.

* cited by examiner

TIME SERIES
Sparse 3D Points

Static 3D Base Mesh

Multiview Facial Marker Tracking Video

TIME SERIES
Face Deformation 3D Meshes

FIG.11

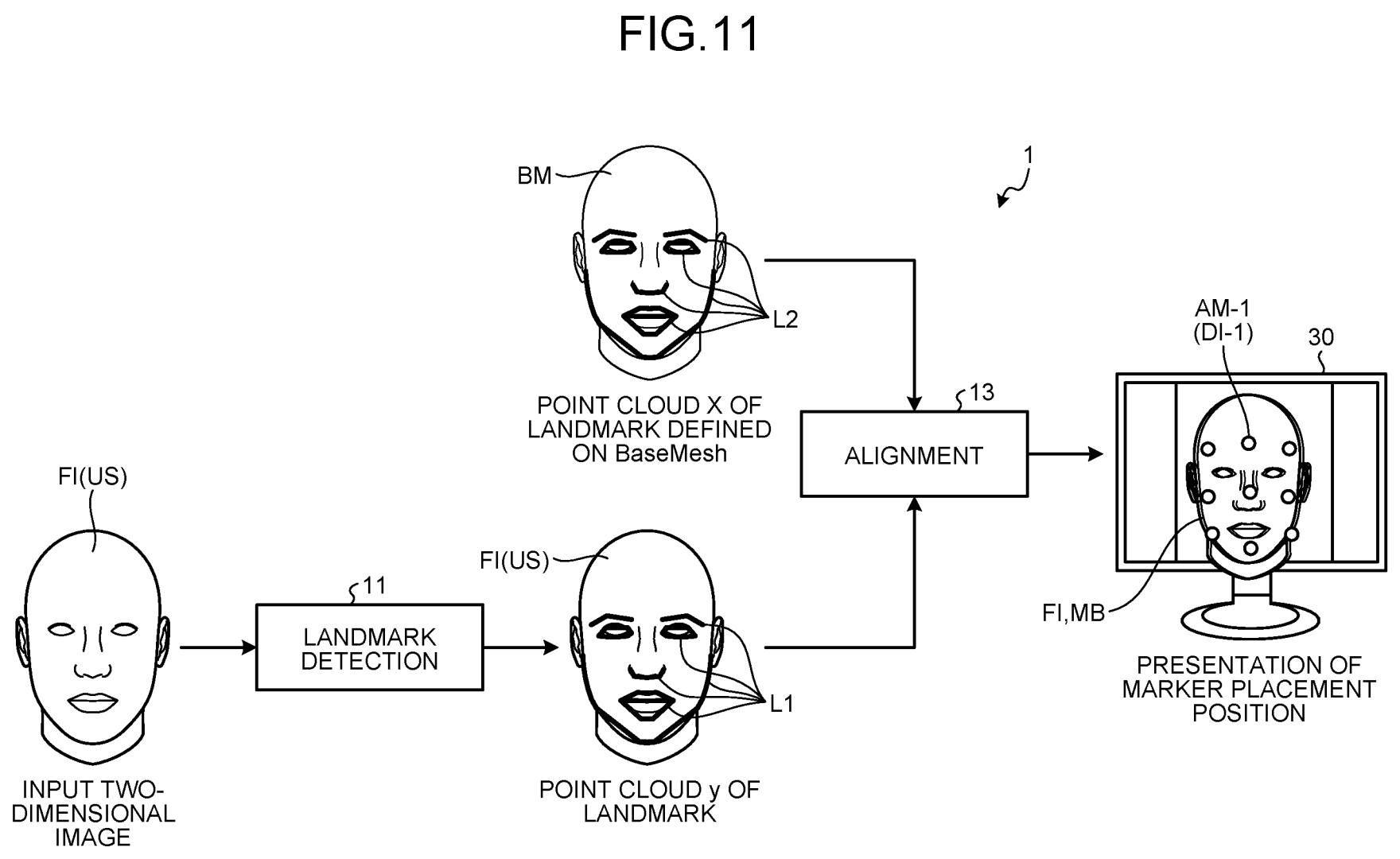

INPUT TWO-
DIMENSIONAL
IMAGE

FI(US)

LANDMARK
DETECTION

11

POINT CLOUD y OF
LANDMARK

FI(US)

L1

POINT CLOUD X OF
LANDMARK DEFINED
ON BaseMesh

BM

L2

ALIGNMENT

13

1

PRESENTATION OF
MARKER PLACEMENT
POSITION

LIVE-ACTION IMAGE

DETECTION OF LANDMARK

FACE MODEL OVERLAID ON FACE IMAGE

Figure 13:
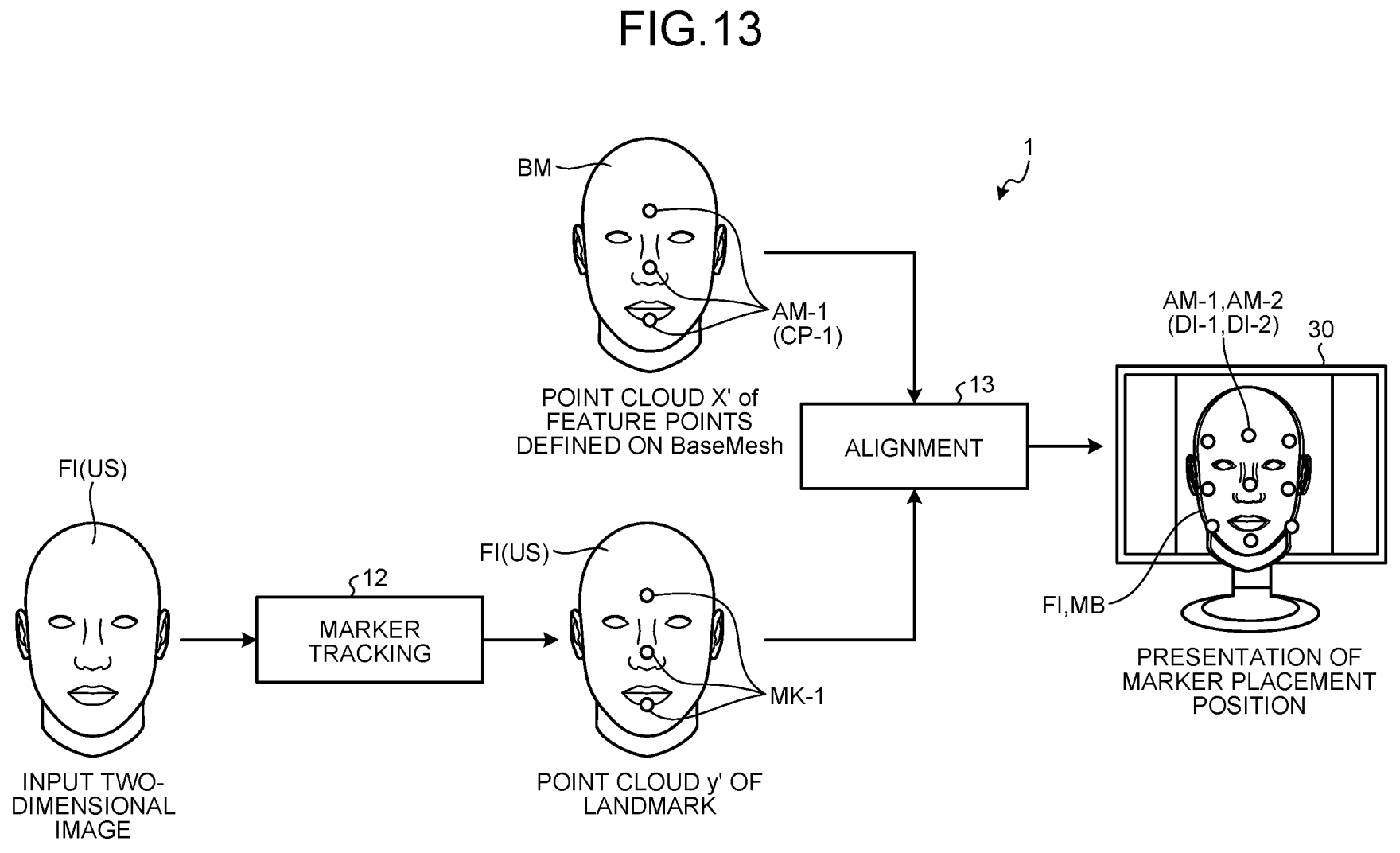

PRESENTATION OF
MARKER PLACEMENT
POSITION

1

13

ALIGNMENT

AM-1
(CP-1)

BM

POINT CLOUD X' of
FEATURE POINTS
DEFINED ON BaseMesh

MK-1

FI(US)

POINT CLOUD y' OF
LANDMARK

12

MARKER
TRACKING

FI(US)

INPUT TWO-
DIMENSIONAL
IMAGE

FIG.14

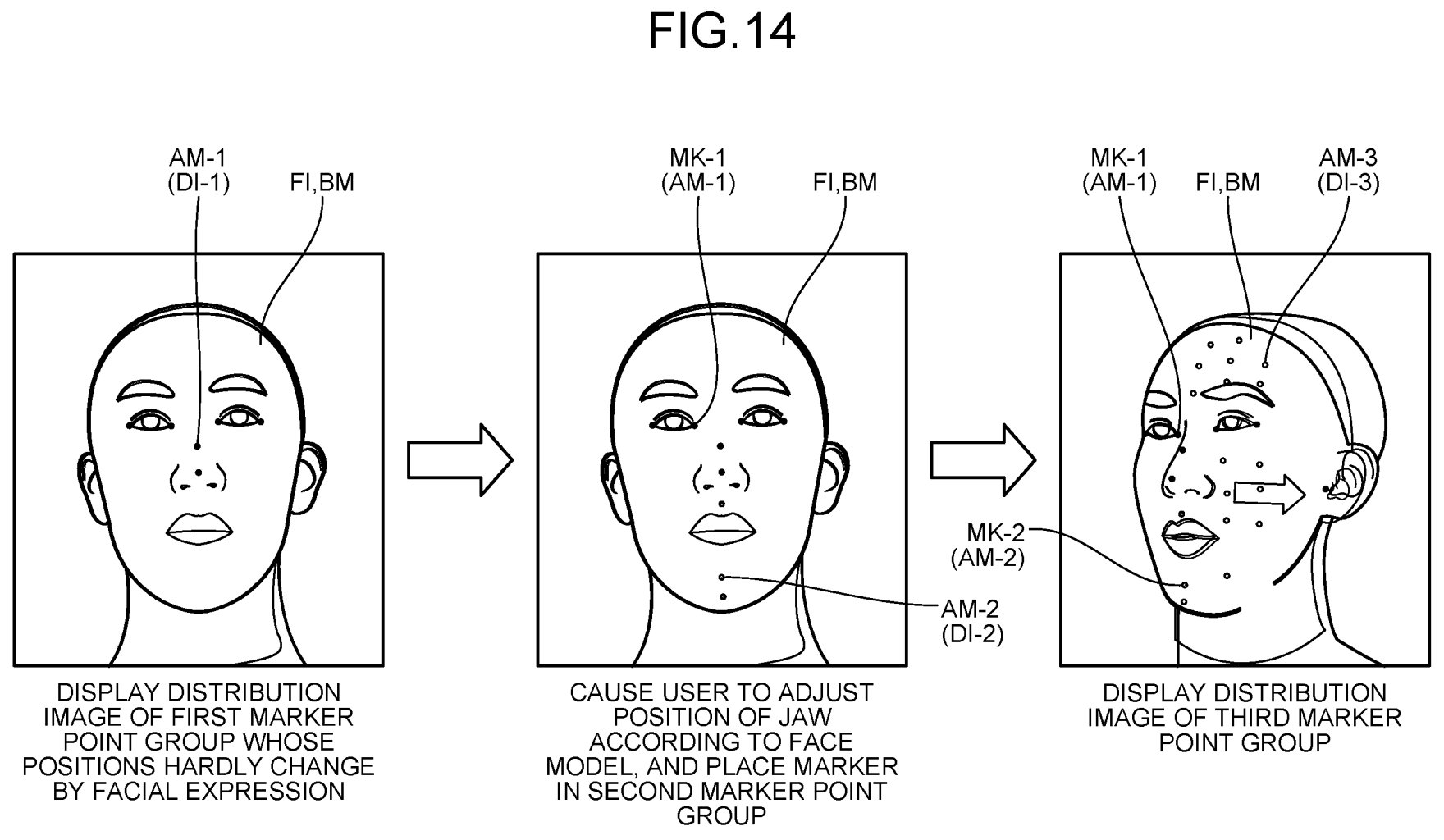

DISPLAY DISTRIBUTION IMAGE OF THIRD MARKER POINT GROUP

AM-3 (DI-3)

FI,BM

MK-1 (AM-1)

MK-2 (AM-2)

AM-2 (DI-2)

CAUSE USER TO ADJUST POSITION OF JAW ACCORDING TO FACE MODEL, AND PLACE MARKER IN SECOND MARKER POINT GROUP

FI,BM

MK-1 (AM-1)

DISPLAY DISTRIBUTION IMAGE OF FIRST MARKER POINT GROUP WHOSE POSITIONS HARDLY CHANGE BY FACIAL EXPRESSION

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2022/002349 filed on Jan. 24, 2022, which claims priority benefit of Japanese Patent Application No. JP 2021-088407 filed in the Japan Patent Office on May 26, 2021. Each of the above-referenced applications is hereby incorporated herein by reference in its entirety.

FIELD

The present disclosure relates to an information processing apparatus, an information processing method, and a program.

BACKGROUND

A method of recording a motion of a face of a performer by adhering a plurality of markers to the face and tracking positions of the markers is known. For example, in a head-mounted camera system called Vicon Cara, three-dimensional positions of markers tracked by a plurality of cameras are calculated and used to deform a three-dimensional model of a face of a performer.

CITATION LIST

Patent Literature

Patent Literature 1: JP 2009-545083 T
Patent Literature 2: JP 2011-107877 A

SUMMARY

Technical Problem

In order to produce a digital human that moves realistically and naturally, it is important to track a facial marker with high accuracy. If the marker is not placed at an appropriate position, tracking cannot be performed as expected and quality at the time of facial expression reproduction by computer graphic (CG) can be degraded, which is problematic. At present, a reference image indicating marker placement positions is displayed on paper or a display, and the markers are placed while comparing the face of the performer with the reference image. However, with this method, it takes time to place the markers, and positional deviation is likely to occur.

A method of extracting a feature point of a face by image analysis and using the extracted feature point as a marker is also known (see Patent Literature 1). For example, in a tracking system of Faceware Technologies, Inc., a performer makes a predetermined facial expression, and a facial expression model registered in the system is collated with a face image of the performer to extract a feature point. However, it is difficult to improve positional accuracy of the marker due to accuracy of image analysis, reproducibility of the facial expression of the performer, or the like.

A method in which a three-dimensional model of a face is superimposed on a face image and used as a guide for placing a marker on the face, and a method in which a three-dimensional model is superimposed on a face image by using a feature point of the face are also known (see Patent Literature 2). However, a mechanism for exactly superimposing a three-dimensional model of a face on a face image is not presented. Therefore, it is difficult to improve positional accuracy of a marker.

Therefore, the present disclosure proposes an information processing apparatus, an information processing method, and a program capable of improving positional accuracy of a marker.

Solution to Problem

According to the present disclosure, an information processing apparatus is provided that comprises: a display control unit that displays a distribution image indicating distribution of a plurality of marker points extracted from a face model of a performer in a superimposed manner on a face image of the performer; and a fitting unit that fits the face model to the face image by using position information of a placed marker each time the marker is placed on a face of the performer after the distribution image is superimposed, and adjusts a superimposed position of the distribution image based on a fitting result. According to the present disclosure, an information processing method in which an information process of the information processing apparatus is executed by a computer, and a program causing a computer to perform the information process of the information processing apparatus are provided.

BRIEF DESCRIPTION OF DRAWINGS

FIG. 11 is a diagram illustrating fitting using a landmark.
FIG. 12 is a diagram illustrating the fitting using a landmark.
FIG. 13 is a diagram illustrating fitting using a marker.
FIG. 14 is a view illustrating the fitting using a marker.
FIG. 15 is a view illustrating the fitting using a marker.

DESCRIPTION OF EMBODIMENTS

Hereinafter, embodiments of the present disclosure will be described in detail with reference to the drawings. In each of the following embodiments, the same reference signs denote the same portions, and an overlapping description will be omitted.

Note that the description will be provided in the following order.

[1. Outline of Video Production System]
[2. Marker Placement Method According to Related Art and Problem Thereof]
[3. Outline of Marker Placement Method According to Present Disclosure]
[4. Configuration of Video Production System]
[5. Face Model]
[6. Marker Point]
[7. Fitting Using Landmark]
[8. Fitting Using Marker]
[8-1. Marker Arrangement in First Marker Point Group]
[8-2. Marker Arrangement in Second Marker Point Group]
[8-3. Marker Arrangement in Third Marker Point Group]
[9. Outlier Detection]
[10. Effects]
[11. Modified Example]

1. Outline of Video Production System

Figure 1:
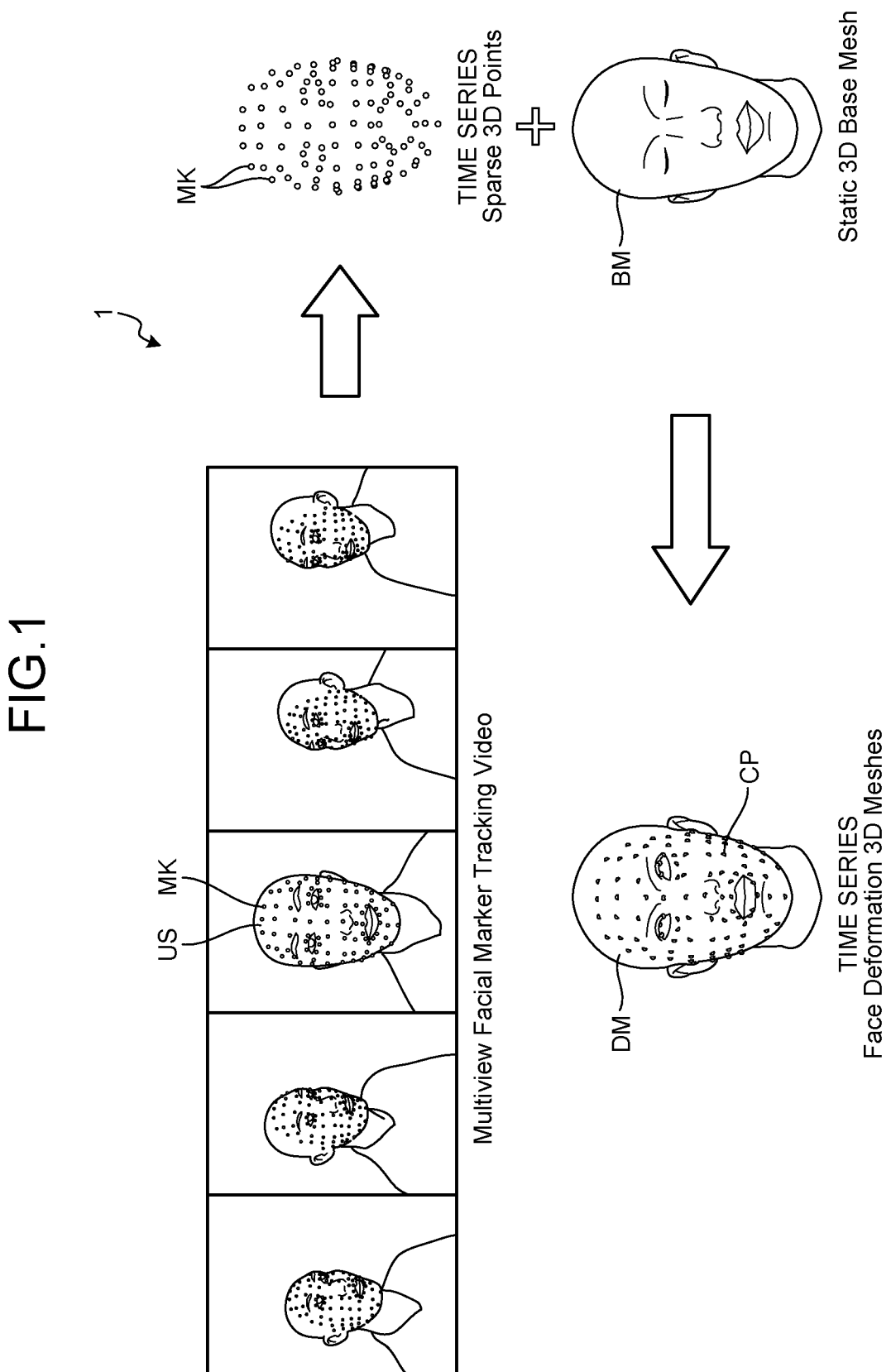
FIG. 1 is a diagram illustrating an outline of a video production system.

FIG. 1 is a diagram illustrating an outline of a video production system 1.

The video production system 1 is a system that produces a digital human using a facial marker tracking technology. The video production system 1 tracks movement of a marker MK placed on a face of a performer US. A plurality of marker points CP indicating placement positions of the markers MK are set in advance on the face of the performer US. The video production system 1 models a facial expression of the performer US based on relative movement between the markers MK (portions of the face defined as the marker points CP).

In the present disclosure, the performer is not limited to a professional performer, and may include a general user. It should be noted that in the present disclosure, the term "performer" is a generic term for users who use a system that provides a digital human, and is not a term representing a user who uses a digital human to achieve a specific purpose.

The video production system 1 acquires a face model BM of a computer graphic (CG) character as a base. The video production system 1 applies a modeled facial expression to the face model BM to generate a facial expression model DM. In the example of FIG. 1, the face model BM of the performer US is used as the face model of the CG character, but the modeled facial expression may be applied to a face model of another CG character.

2. Marker Placement Method According to Related Art and Problem Thereof

Figure 2:
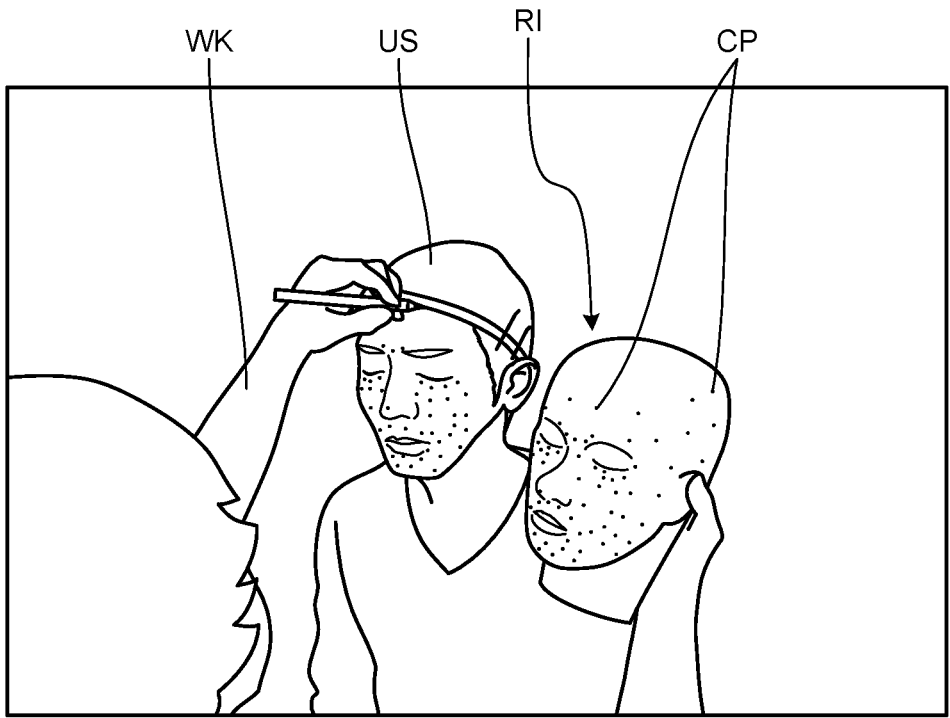
FIG. 2 is a view illustrating a marker placement method according to a related art.
Figure 3:
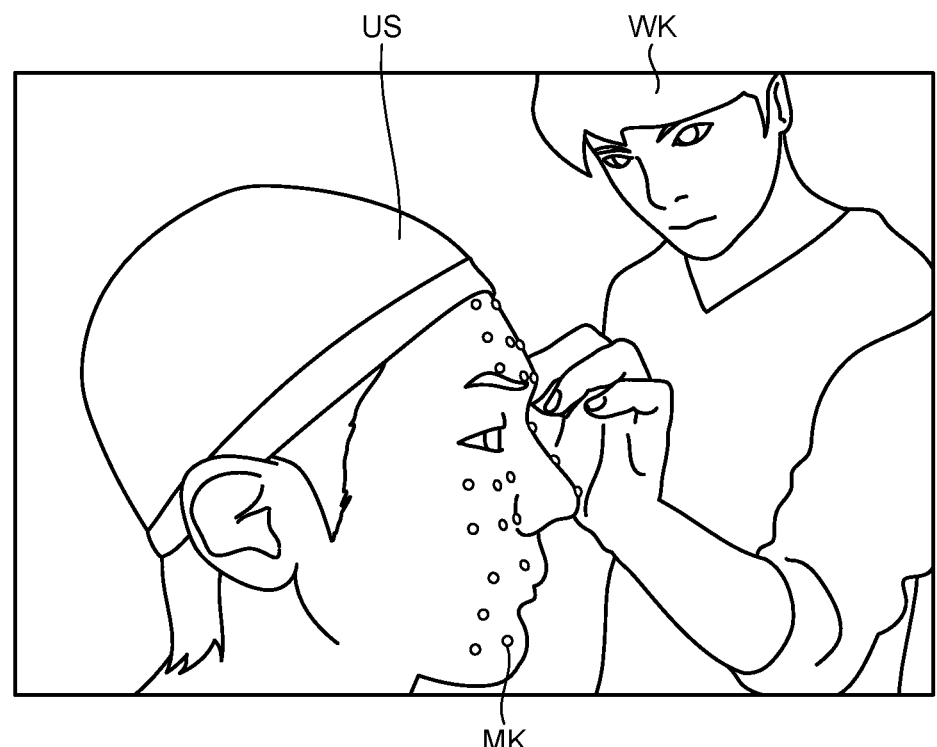
FIG. 3 is a view illustrating the marker placement method according to the related art.
Figure 4:
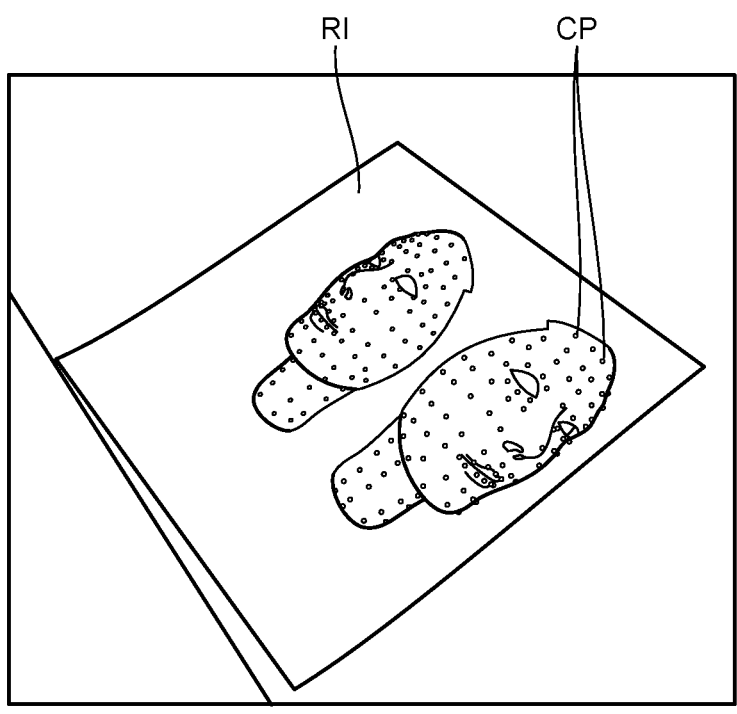
FIG. 4 is a view illustrating the marker placement method according to the related art.

FIGS. 2 to 4 are views illustrating a marker placement method according to a related art.

In the method according to the related art, a worker WK manually places the marker MK on the face of the performer US while referring to reference information RI indicating a marker placement position. In the example of FIG. 2, the marker point CP marked on a face of a mannequin is used as the reference information RI. The worker draws a mark on the face of the performer US with a pen while confirming the position of the marker point CP. As illustrated in FIG. 3, when drawing of all the marks is completed, the markers MK are placed at the positions of the marks.

A placement form of the marker MK is not particularly limited. In the example of FIG. 3, a high-reflectance member functioning as the marker MK is bonded to the face. However, a mark functioning as the marker MK may be drawn on the face with a pen. In the example of FIG. 2, the face of the mannequin on which the marker point CP is marked is used as the reference information RI, but the reference information RI is not limited thereto. As illustrated in FIG. 4, an image of a face on which the marker point CP is marked may be printed, and the face of the performer US may be marked with reference to the printed paper sheet.

Figure 5:
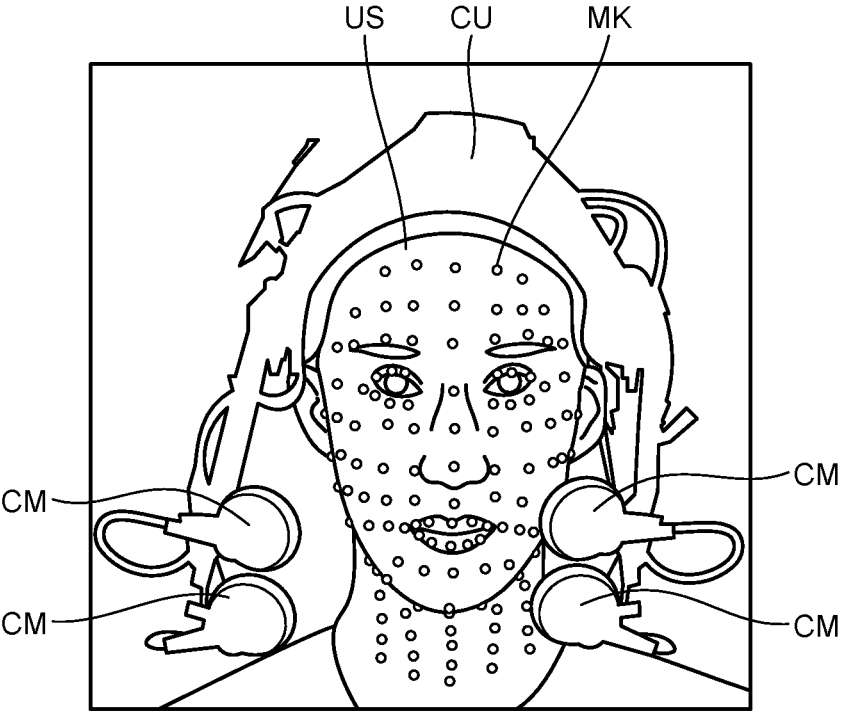
FIG. 5 is a view illustrating a state of tracking a marker.

FIG. 5 is a view illustrating a state of tracking the marker MK.

A camera unit CU for imaging the performer US is attached to a head of the performer US on which the marker MK is placed. For example, a plurality of cameras CM whose visual fields partially overlap each other are fixed to the camera unit CU. The camera unit CU images the entire placement region of the markers MK by using the plurality of cameras CM. The plurality of cameras CM are driven in synchronization and monitor movement of each marker MK.

Movement of the marker point CP is detected as the movement of the marker MK. The movement of the face is modeled based on a positional relationship between the marker points CP. In order to accurately reproduce the movement of the face, it is necessary to track the movement of the marker point CP with high accuracy. However, in the method according to the related art, it is difficult to accurately place the marker MK at the marker point CP. When the position of the marker MK deviates, the movement of the marker point CP cannot be accurately detected. Therefore, it is difficult to accurately model the movement of the face.

3. Outline of Marker Placement Method According to Present Disclosure

Figure 6:
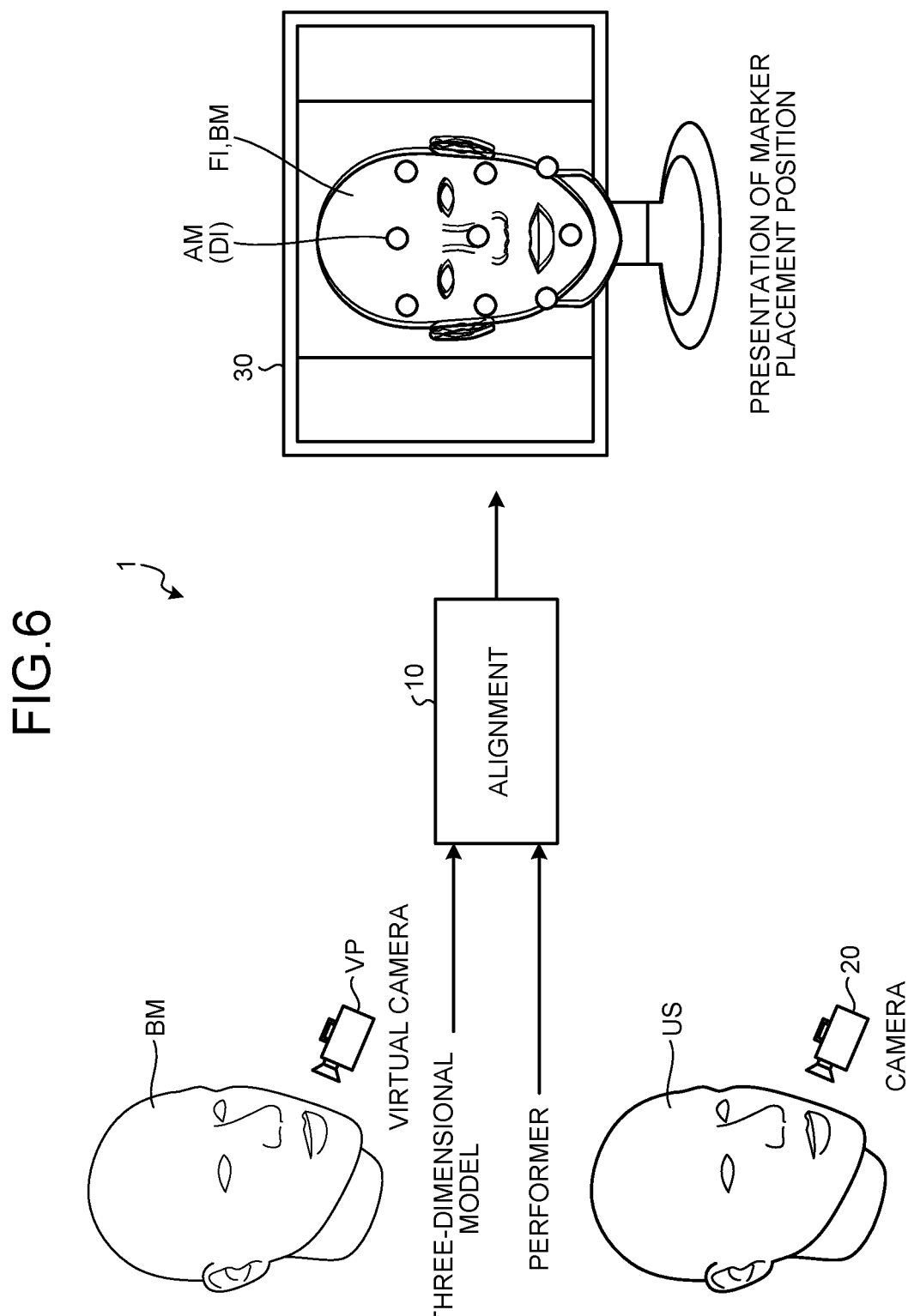
FIG. 6 is a diagram illustrating an outline of a marker placement method according to the present disclosure.
Figure 7:
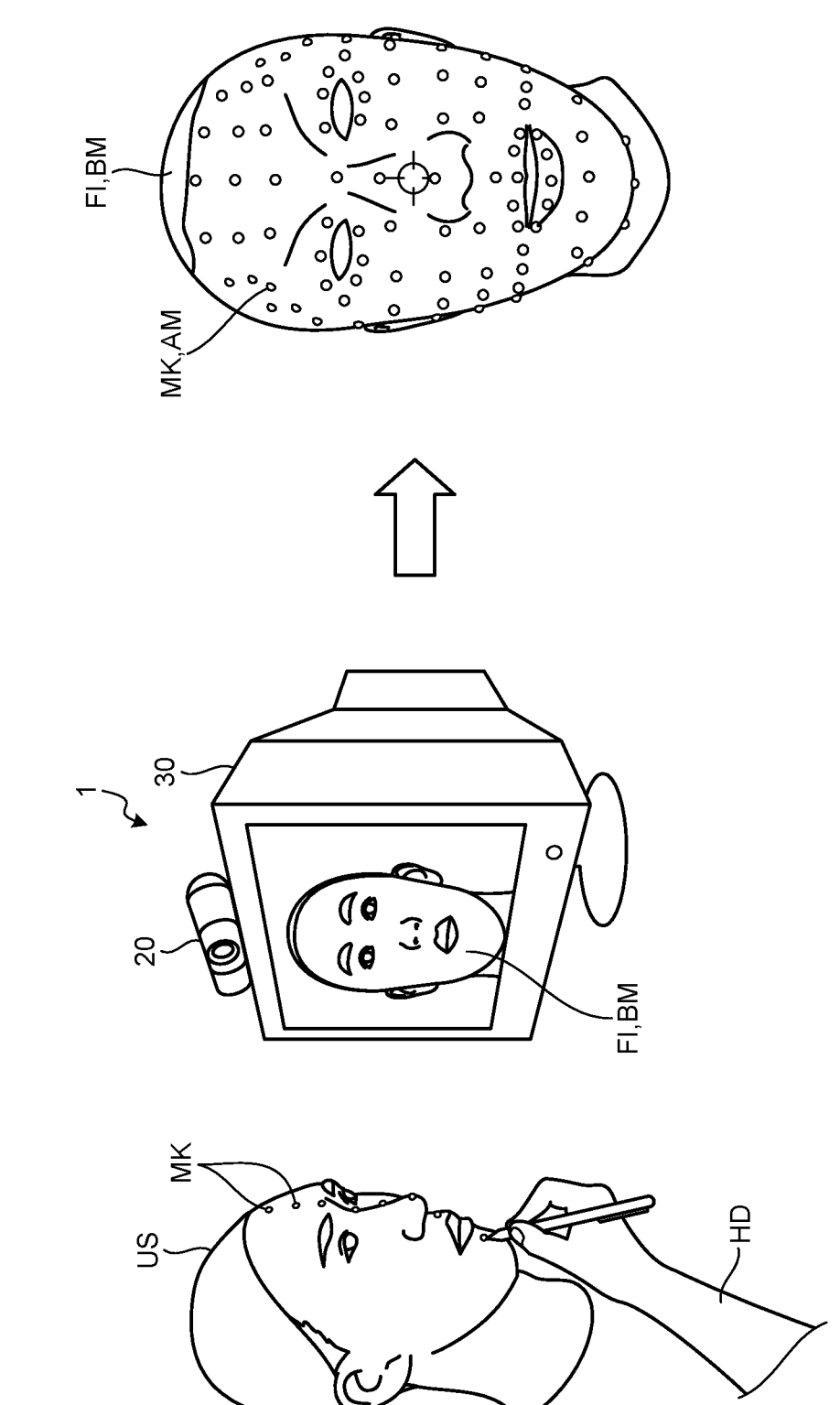
FIG. 7 is a view illustrating a marker placement scene.

FIG. 6 is a diagram illustrating an outline of a marker placement method according to the present disclosure. FIG. 7 is a view illustrating a marker MK placement scene.

As described above, in the method according to the related art, the marker MK is placed on the face of the performer US with reference to the marker point CP marked on the mannequin, paper sheet, or the like. Therefore, the placement position of the marker MK is likely to deviate.

In order to solve this problem, for example, a method of aligning a three-dimensional reference model with a face image of the performer US by using feature point matching and displaying the marker point CP on the face image in a superimposed manner is considered. However, in this method, there is a possibility that the position of the marker MK deviates due to the movement of the face or a change in facial expression of the performer US. In addition, since human faces have individual differences, the position of the marker point CP of the face of the performer US cannot be accurately indicated even in a case where a general reference model is used.

Therefore, in the present disclosure, the face model BM of the performer US in which position information of the marker point CP is defined is fitted to (aligned with) a face image FI of the performer US. The worker WK places the marker MK on the face of the performer US while confirming the position of the marker point CP positioned on the face image FI.

The position of the marker point CP is indicated by an augmented reality (AR) marker AM. In the face image FI, a plurality of AR markers AM corresponding to the marker points CP on a one-to-one basis are displayed. A distribution image DI indicating distribution of the plurality of marker points CP is presented by the plurality of AR markers AM. By fitting the face model BM to the face image FI, the plurality of AR markers AM are positioned at appropriate positions in the face image FI.

The video production system 1 repeats fitting by using the position information of the placed marker MK each time the marker MK is placed, so that the marker point CP is displayed at a more accurate position. As a result, accuracy of positioning between the face image FI and the face model BM is improved each time the marker MK is placed. As a result, the accuracy of positioning of the marker point MP with respect to the face image FI is also improved, and the position of the marker MK placed thereafter becomes also more accurate.

The marker MK is manually placed by the worker WK. A camera 20 images a hand HD of the worker WK who places the marker MK, but the image of the hand HD of the worker WK is removed from the face image FI by image processing.

4. Configuration of Video Production System

Figure 8:
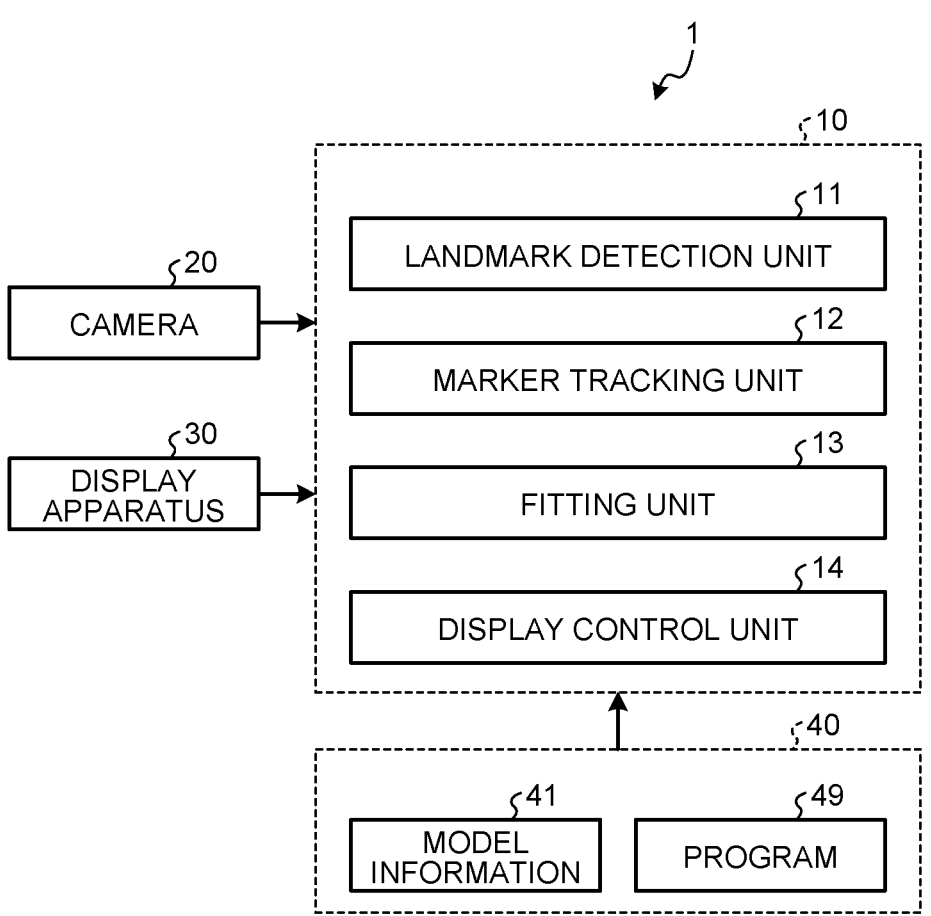
FIG. 8 is a diagram illustrating an example of a configuration of the video production system.

FIG. 8 is a diagram illustrating an example of a configuration of the video production system 1.

The video production system 1 includes a processing apparatus 10, the camera 20, a display apparatus 30, and a storage apparatus 40. The camera 20 is fixed in front of the performer US who is a placement target for the marker MK. While the marker MK is being placed, the camera 20 images the face of the performer US at a predetermined frame rate, and sequentially outputs the face image FI of the performer US to the processing apparatus 10.

The processing apparatus 10 is an information processing apparatus that processes various types of information. The processing apparatus 10 includes a landmark detection unit 11, a marker tracking unit 12, a fitting unit 13, and a display control unit 14.

The processing apparatus 10 extracts information regarding the face model BM of the performer US from model information 41. The processing apparatus 10 extracts registered landmark information and the position information of the marker point CP from the face model BM. The registered landmark information includes position information of a landmark (a registered landmark L2: see FIG. 11) registered as a point cloud indicating the shape of the face. The registered landmark L2 is extracted from, for example, the face image FI obtained by imaging the performer US from the front.

The landmark detection unit 11 detects a landmark L1 corresponding to the registered landmark L2 from the face image FI for each frame. The marker tracking unit 12 detects the marker MK from the face image FI and tracks the detected marker MK. The fitting unit 13 fits the face model BM to the face image FI for each frame based on position information of the landmark L1 and position information of the marker MK.

The display control unit 14 renders the face model BM based on a virtual viewpoint VP (see FIG. 6) obtained from the fitting result. The display control unit 14 extracts the position information of the marker points CP from the face model BM and generates the distribution image DI of the marker points CP. The display control unit 14 outputs information regarding the face image FI, a rendering image, and the distribution image DI to the display apparatus 30. As a result, the display control unit 14 displays the face model BM fitted to the face image FI in a superimposed manner on the face image FI together with the distribution image DI.

Each time the marker MK is placed on the face of the performer US after the distribution image DI is superimposed, the fitting unit 13 fits the face model BM to the face image FI by using the position information of the placed marker MK. The fitting unit 13 adjusts the superimposed position of the distribution image DI superimposed on the face image FI based on the fitting result.

The storage apparatus 40 stores information regarding settings, conditions, and criteria used for various calculations, the model information 41 regarding the face model BM, and a program 49 executed by the processing apparatus 10. The program 49 is a program that causes a computer to execute information processing according to the present embodiment. The processing apparatus 10 performs various types of processing according to the program 49 stored in the storage apparatus 40. The storage apparatus 40 may be used as a work area for temporarily storing a processing result of the processing apparatus 10.

The storage apparatus 40 includes any non-transitory storage medium such as a semiconductor storage medium or a magnetic storage medium. The storage apparatus 40 includes, for example, an optical disk, a magneto-optical disk, or a flash memory. The program 49 is stored in, for example, a non-transitory computer-readable storage medium.

The processing apparatus 10 is, for example, a computer including a processor and a memory. The memory of the processing apparatus 10 includes a random access memory (RAM) and a read only memory (ROM). The processing apparatus 10 implements the function of each unit by executing the program 49.

5. Face Model

Figure 9:
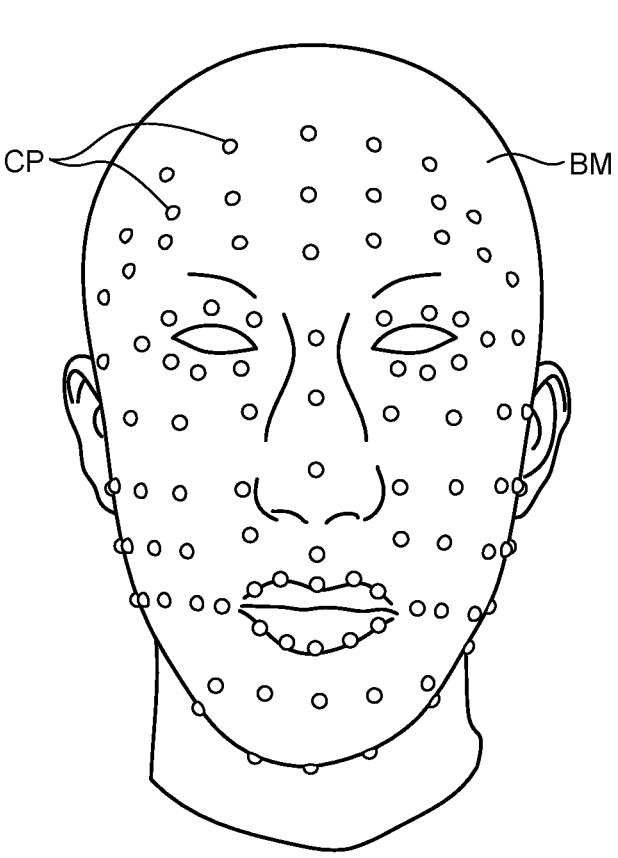
FIG. 9 is a view illustrating an example of a face model of a performer.

FIG. 9 is a view illustrating an example of the face model BM of the performer US.

The face model BM is a three-dimensional model of the face of the performer US. A facial expression of the face model BM is, for example, an expressionless facial expression. The face model BM is created by general CG software. For example, the face of the face model is implemented by a polygon mesh. The polygon mesh includes a plurality of vertices, and a plurality of sides and a plurality of surfaces obtained by connecting adjacent vertices.

The face model BM includes the position information of the plurality of marker points CP set on the face of the performer US. The positions of the marker points CP are individually determined in accordance with the shape of the face of the performer US. The marker points CP are set substantially uniformly on the entire face. In order to accurately detect the facial expression, the density of the marker points CP set at the eye and mouth is set higher than the density of the marker points CP set at other portions.

6. Marker Point

Figure 10:
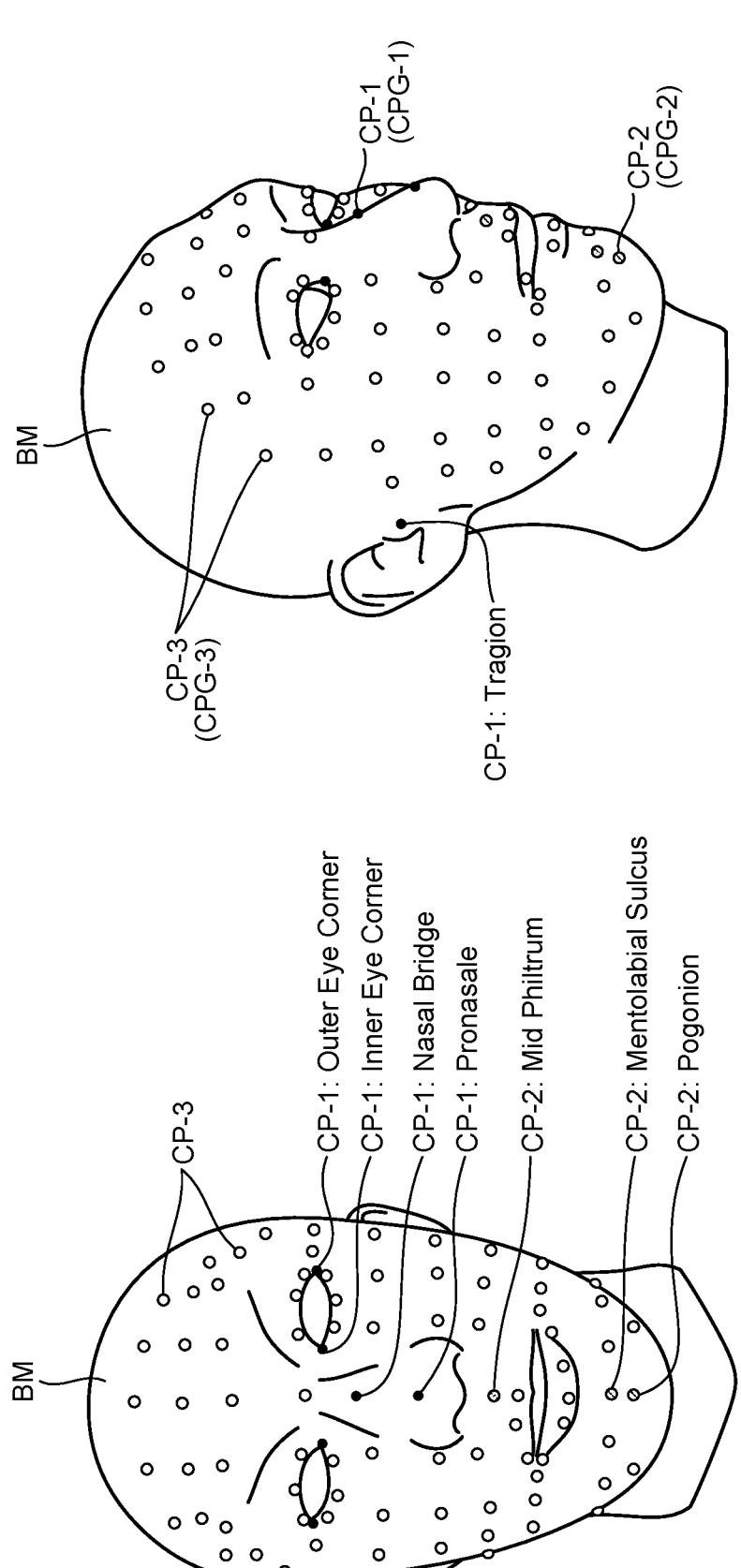
FIG. 10 is a view for describing marker points.

FIG. 10 is a view for describing the marker points CP.

In the present disclosure, each time the marker MK is placed, fitting is repeated using the position information of the placed marker MK. Stability of the fitting varies depending on a placement order of the markers MK. For example, in a case where the fitting is performed first using the position information of the marker MK whose position hardly changes by the facial expression, the result of the fitting performed thereafter is likely to be stable.

Therefore, the plurality of marker points CP are classified into a plurality of marker point groups CPG according to the placement order of the markers MK. The marker point group CPG whose positions hardly change by the facial expression has a higher priority of fitting. The worker WK places the marker MK first from the marker point group CPG having a high priority. In order to support the marker placement work, the display control unit 14 sequentially displays the distribution images DI from the distribution image DI indicating the positions of the marker point group CPG having a high priority.

Hereinafter, the plurality of marker point groups CPG are distinguished by a number attached after a sign. The same applies to a method of distinguishing constituent elements (the marker points CP, the markers MK, the AR markers AM, and the like) corresponding to each marker point group CPG.

The face model BM includes the position information of the plurality of marker point groups CPG having different priorities of fitting. For example, the plurality of marker point groups CPG include a first marker point group CPG-1, a second marker point group CPG-2, and a third marker point group CPG-3 in descending order of the priority of fitting.

A first marker point CP-1 is set at a portion of the face other than the jaw. The position of the first marker point CP-1 hardly changes by the facial expression. The worker WK first places a first marker MK-1 in the first marker point group CPG-1. The face model BM is positioned in a translation direction and a rotation direction based on position information of the first marker MK-1 placed in the first marker point group CPG-1.

The first marker point group CPG-1 includes one or more anatomical feature points existing in the portion of the face other than the jaw. The anatomical feature point means a characteristic body part obtained from the structure or shape of the human body. The anatomical feature point is a feature point caused by a morphological feature such as the bone or the muscle, or a structural feature such as the eye, the nose, and the ear, and is clearly identified visually.

In the example of FIG. 10, eight first marker points CP-1 are set at outer eye corners, inner eye corners, a nasal bridge, a pronasale, and tragions. These first marker points CP-1 are all anatomical feature points caused by structural features of the eyes, the nose, the ears, and the like. The worker WK can accurately place the first marker MK-1 at the first marker point CP-1 based on the morphological feature of the anatomical feature point.

A second marker point CP-2 is set at the jaw. After completing the placement of the first marker MK-1 in the first marker point group CPG-1, the worker WK starts placement of a second marker MK-2 at the second marker point CP-2. A second marker point group CPG-2 includes one or more anatomical feature points existing in the jaw. In the example of FIG. 10, three second marker points CP-2 are set at a mid philtrum, a mentolabial sulcus, and a pogonion. These second marker points CP-2 are all anatomical feature points caused by the structural features of the jaw.

Third marker points CP-3 are set substantially uniformly on the entire face. After completing the placement of the second marker MK-2 in the second marker point group CPG-2, the worker WK starts placement of a third marker MK-3 at the third marker point CP-3.

7. Fitting Using Landmark

Figure 12:
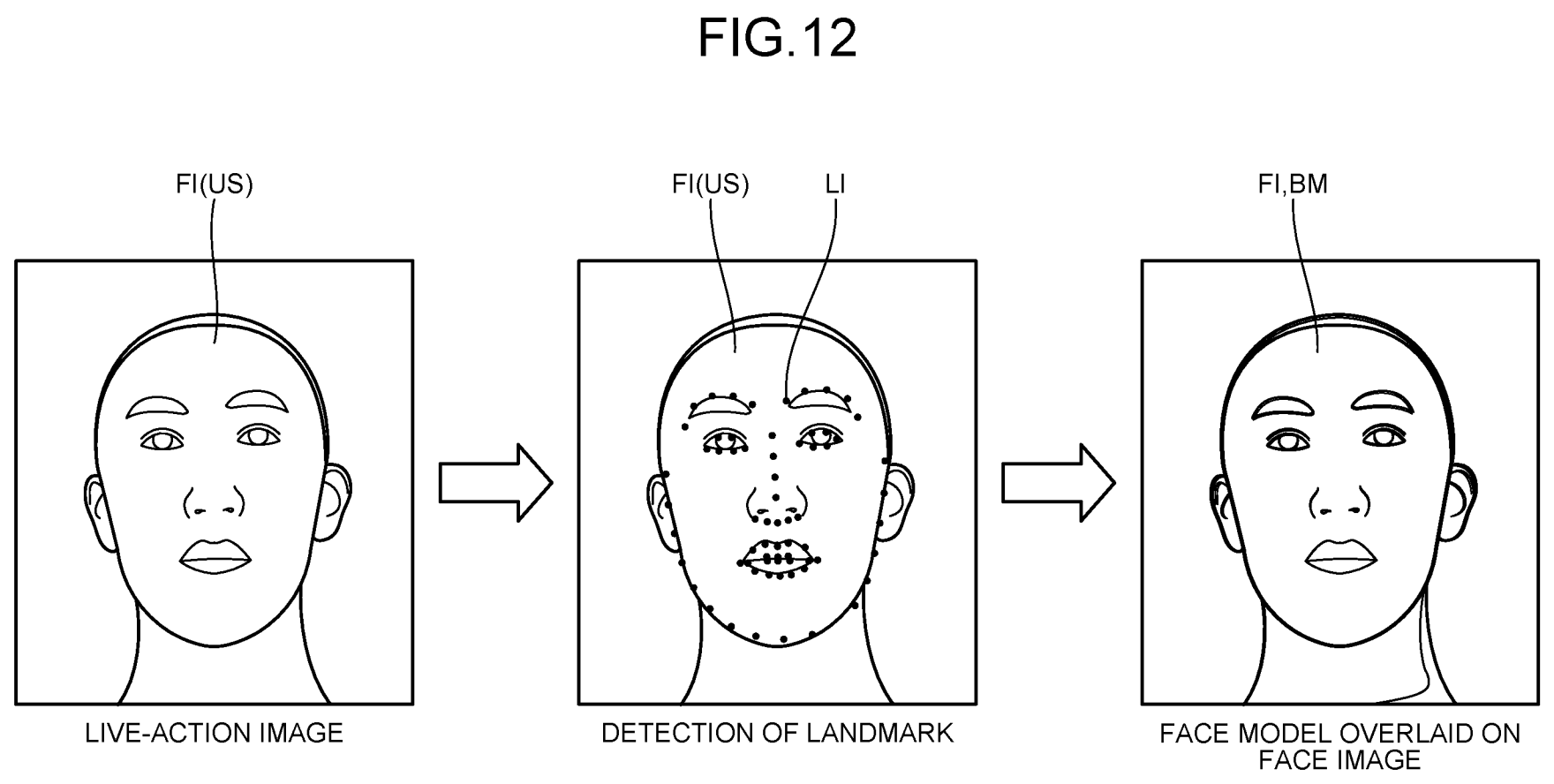

FIGS. 11 and 12 are diagrams illustrating fitting using the landmark L1.

The fitting of the face model BM is performed in two stages. In the first stage, rough fitting based on the shape of the face is performed. In the second stage, processing (refinement) for enhancing accuracy of the fitting is performed based on the position information of the markers MK sequentially placed.

In the fitting of the first stage, a set of feature points of respective parts called the landmarks, such as a contour of the face, the eyes, the nose, and the mouth, is used. There are various landmark determination methods, and for example, 68 points are defined as the landmarks in a machine learning library called dlib. For example, in the face model BM, a set of points (point cloud) defined by the dlib is registered as the registered landmark L2. Hereinafter, a three-dimensional point cloud registered as the registered landmark L2 is denoted by X, and the number of points is denoted by L.

The landmark detection unit 11 detects the landmark L1 corresponding to the registered landmark L2 from the face image FI. A two-dimensional point cloud detected as the landmark L1 is defined as y. The point cloud y and the point cloud X are associated with each other by a number defined in the registered landmark L2.

The fitting unit 13 performs fitting by using the position information of the plurality of landmarks L1 extracted from the face image FI. The fitting unit 13 sets a superimposed position of a first distribution image DI-1 indicating distribution of the first marker point group CPG-1 having the highest priority based on the fitting result.

For example, the fitting unit 13 aligns the point cloud X and the point cloud y by using a rotation matrix R and a translation matrix t of the face model BM. Since the point cloud X is a point cloud in a three-dimensional space, the fitting unit 13 projects the point cloud X on a two-dimensional plane by using an internal matrix K of the camera. Formula 1 of the fitting is as follows.

$$\min_{R,t} \sum_{i=0}^{L-1} dist(y_i - K(RX_i + t)) \qquad \text{Formula 1}$$

The fitting unit 13 calculates the matrices R and t that minimize the above Formula 1. As a point cloud alignment method, for example, an algorithm called interactive closest point (ICP) for minimizing a difference between two point clouds is used. The ICP is described in the following [1].

[1] S. Arun, T. S. Huang, S. D. Blostein, "Least-square fitting of two 3-D point sets" IEEE Pattern Analysis and Machine Intelligence, 1987

Formula 1 may be described again by using the ICP as in the following Formula 2.

$$\min_{R,t} \sum_{i=0}^{L-1} \|y_i - K(RX_i + t)\|^2 \qquad \text{Formula 2}$$

The display control unit 14 renders the face model BM by using the calculated matrices R and t. The display control unit 14 displays the rendering image of the face model BM in a superimposed manner on the face image FI. The display control unit 14 generates the first distribution image DI-1 of the first marker point group CPG-1 by using the matrices R and t. The display control unit 14 displays the generated first distribution image DI-1 in a superimposed manner on the face image FI.

8. Fitting Using Marker

Figure 15:
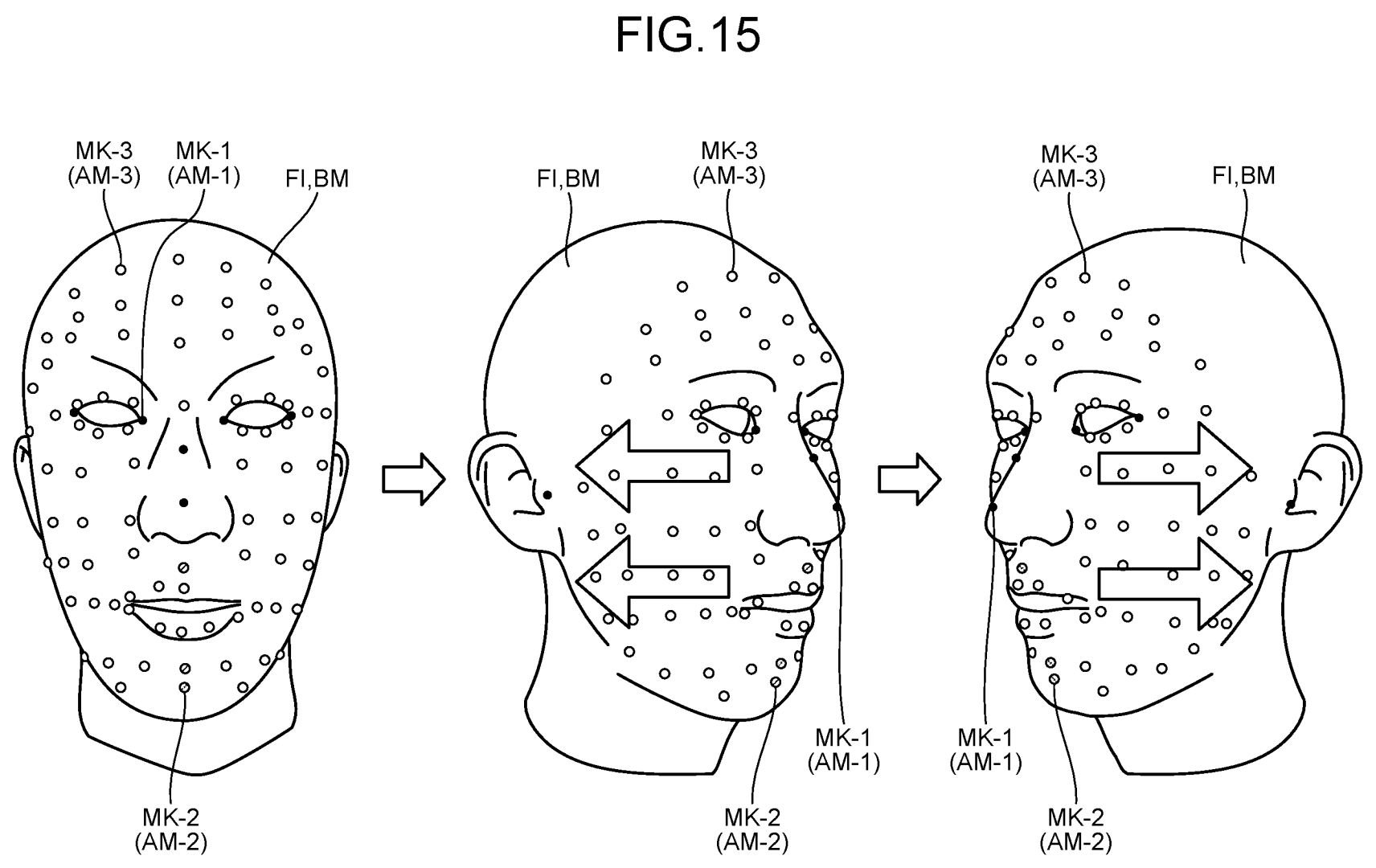

FIGS. 13 to 15 are views illustrating fitting using the marker MK.

In general, the accuracy of landmark detection becomes unstable depending on the facial expression of the performer US and the orientation of the face. For example, when the performer US slightly turns the face to the side to place the marker MK near the ear, face detection that is the previous stage of the landmark detection fails.

Therefore, in the present disclosure, fitting using the position information of the marker MK is performed as the fitting of the second stage. In the fitting of the second stage, the position information of the marker MK actually placed is used. Therefore, more accurate fitting is performed. In addition, since it is not necessary for the performer US to fix the facial expression so that the landmark L1 is easily detected, a burden on the performer US is reduced.

The marker tracking unit 12 tracks the marker MK by using the face image FI of the performer US. A two-dimensional point cloud of the tracked markers MK is defined as y'. A three-dimensional point cloud of the marker points CP defined on the face model BM is defined as X'. When it is assumed that the number of markers MK placed on the face is M, Formula 3 of the fitting is as follows.

$$\min_{R,t}\left(w_M * \sum_{i=0}^{M-1} dist(y'_i - K(RX'_i + t)) + \qquad \text{Formula 3}\right.$$
$$\left. w_L * \sum_{i=0}^{L-1} dist(y_i - K(RX_i + t))\right)$$

In Formula 3, $w_M$ represents a weight of the position information of the placed marker MK. $w_L$ indicates a weight of the position information of the landmark L1. Values of $w_M$ and $w_L$ are appropriately set according to reliability of the position information of the marker MK. The values of $w_M$ and $w_L$ may be fixed, or may be sequentially changed according to a placement status of the markers MK (the position and number of placed markers MK).

In general, the position information of the marker MK is more reliable than the position information of the landmark L1. Therefore, when $w_M$ is larger than $w_L$, alignment robust to changes in facial expression and face orientation is achieved. Therefore, for example, the fitting unit 13 increases contribution of the position information of the marker MK to the fitting as the number of placed markers MK increases. For example, in a case where the number M of placed markers MK becomes equal to or larger than a reference value (for example, three), $w_L$ is set to 0. In this way, fitting that sufficiently takes into consideration the position information of the marker MK with high reliability is performed.

Here, in order to solve six unknown parameters of three-dimensional rotation and translation, the number M of placed markers MK needs to be at least three or more. The fitting unit 13 calculates the matrices R and t that minimize the above Formula 3. The display control unit 14 renders the face model BM by using the calculated matrices R and t. The display control unit 14 superimposes the rendering image of the face model BM on the face image FI. The display control unit 14 generates a second distribution image DI-2 of the second marker point group CPG-2 by using the matrices R and t. The display control unit 14 displays the generated second distribution image DI-2 in a superimposed manner on the face image FI.

Figure 16:
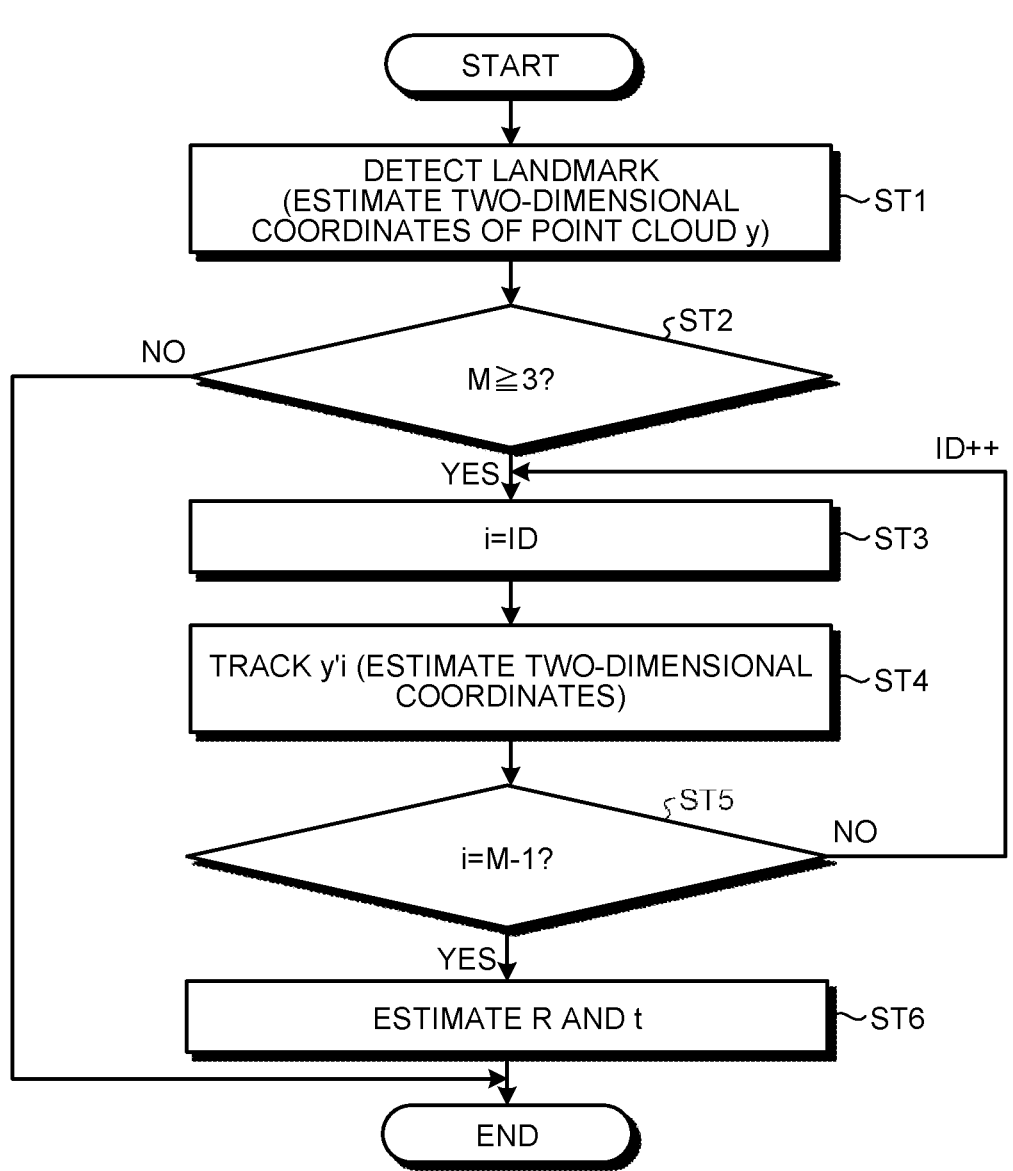
FIG. 16 is a flowchart illustrating an example of fitting of a second stage.

FIG. 16 is a flowchart illustrating an example of the fitting of the second stage. The flow in FIG. 16 is performed for each frame.

The landmark detection unit 11 estimates two-dimensional coordinates of a point cloud $y_i$ by detecting the landmark L1 (step ST1). The marker tracking unit 12 determines whether or not the number M of markers MK placed on the face of the performer US is three or more (step ST2).

In a case where the number M of placed markers MK is less than three (step ST2: no), the fitting unit 13 performs fitting using only the landmark L1 (step ST6). In a case where the number M of placed markers MK is three or more (step ST2: yes), the fitting unit 13 estimates the two-dimensional coordinates of each marker MK ($y'_i$: i=0, 1, 2, . . . , and M−1) (steps ST3 to ST5).

Here, the placed marker MK ($y'_i$) has a marker identification (ID). The marker ID is used to manage which marker point CP of the point cloud X' the placed marker MK ($y'_i$) corresponds to. By registering the placement order of the markers MK as an ID for each marker point CP of the point cloud X' in advance, the markers MK ($y'_i$) placed in the ID order can be associated with the marker points CP ($X'_i$).

The fitting unit 13 estimates the matrices R and t by using the two-dimensional coordinates of the M markers MK ($y'_i$) estimated by tracking and the two-dimensional coordinates of the point cloud $y_i$ obtained first (step ST6).

For the marker MK ($y'_i$) that is newly proposed to be placed, i=M. In a case where placement of a new marker MK ($y'_i$) is detected by the marker tracking unit 12, the fitting unit 13 estimates the matrices R and t after updating the number M of placed markers MK. Whether or not a new marker MK is placed is detected, for example, by detecting a blob around the presented marker point CP (AR marker AM). In a case where a blob is detected, it is determined that a new marker MK has been placed.

The marker tracking unit 12 can track the position of the marker MK in the current frame from the position of the marker MK in the previous frame, for example, by calculating an optical flow of each marker MK.

Although there are various methods for calculating the optical flow, for example, in a Lucas-Kanade method, a movement vector is estimated under the constraints such as an invariable luminance of a pixel with respect to time, temporal continuity (a small movement amount), and spatial consistency (nearby pixels move in the same manner). The position of the marker MK in the current frame is acquired by adding the estimated movement vector to the position of the marker MK in the previous frame. The Lucas-Kanade method is described in the following [2].

[2] T. Kanade, B. D. Lucas, "An interactive image registration technique with an application to Stereo Vision," Proceedings of the 7th International Joint Conference on Artificial Intelligence pp. 674-679, 1981

In the above-described processing, the position information of the marker MK placed on the face is used for fitting. In this case, when the facial expression of the face changes, the position of the marker MK deviates from the position defined by the face model BM. Therefore, the placement order of the markers MK is determined in such a way that the accuracy of fitting is less likely to decrease even if the facial expression changes.

[8-1. Marker Arrangement in First Marker Point Group]

After the fitting using the landmark L1 is performed, the first marker point group CPG-1 first becomes a placement target for the marker MK. In order to measure a rigid body motion of the face (excluding a relative motion between the upper jaw and the lower jaw), the first marker MK-1 is placed in the first marker point group CPG-1 set in the portion of the face other than the jaw.

When the fitting using the landmark L1 is completed, the face model BM and the first distribution image DI-1 are displayed in a superimposed manner on the face image FI. The first distribution image DI-1 includes a plurality of first AR markers AM-1 indicating the positions of the first marker point group CPG-1. The worker WK places the first marker MK-1 on the face of the performer US while referring to the position of the first AR marker AM-1 superimposed on the face image FI.

Each time the first marker MK-1 is placed on the face of the performer US based on the first distribution image DI-1, the fitting unit performs fitting by using the position information of the placed first marker MK-1 and the position information of the plurality of landmarks L1. The fitting unit 13 adjusts the superimposed position of the first distribution image DI-1 based on the fitting result.

In the fitting of the first stage, rough positioning based on the shape of the face is performed. Therefore, the first AR marker AM-1 may be displayed at a position slightly deviating from an accurate position. However, the first marker point group CPG-1 includes one or more anatomical feature points whose positions can be accurately specified by visual observation. The worker WK can place the first marker MK-1 at an accurate position based on the morphological feature of the anatomical feature point.

For example, it is assumed that the inner eye corners are set as the first marker points CP-1. In a case where the first AR marker AM-1 is displayed at a position slightly deviating from the inner eye corners, the worker WK searches for an anatomical feature point at a position close to the first AR marker AM-1 if the worker WK knows that the first marker point CP-1 is set as the anatomical feature point. As a result, the worker WK can recognize that the inner eye corner near the first AR marker AM-1 is the first marker point CP-1.

The fitting unit 13 performs fitting of the face model BM by using the position information of the first marker MK-1 placed at the anatomical feature point. The fitting unit 13 adjusts the superimposed position of the first distribution image DI-1 based on the fitting result. Since the position of the first marker MK-1 placed at the anatomical feature point is accurate, a display position of the first distribution image DI-1 after adjustment is also more accurate than before adjustment. Therefore, the accuracy of the placement position of the first marker MK-1 newly placed according to the first distribution image DI-1 after adjustment also increases.

The positions of the first marker point group CPG-1 hardly change by the facial expression. Therefore, even in a case where the facial expression of the performer US slightly changes during the placement work for the first marker MK-1, the display position of the first distribution image DI-1 is unlikely to deviate. Therefore, the worker WK can place the first marker MK-1 at a substantially accurate position. When the number of first markers MK-1 placed at accurate positions increases, the accuracy of the display position of the first distribution image DI-1 also increases. As a result, the accuracy of the display position of the first distribution image DI-1 increases each time the first marker MK-1 is placed.

[8-2. Marker Arrangement in Second Marker Point Group]

After the first marker MK-1 is placed for all the first marker points CP-1 included in the first marker point group CPG-1, placement of the second marker MK-2 in the second marker point group CPG-2 having the second highest priority of fitting is started.

The display control unit 14 displays the second distribution image DI-2 indicating distribution of the second marker point group CPG-2 in a superimposed manner on the face image FI based on the result of fitting using the position information of all the placed first markers MK-1.

A second marker point group CPG-2 includes one or more anatomical feature points existing in the jaw. The performer US adjusts the position of the jaw (a relative position between the upper jaw and the lower jaw) while referring to the face model BM superimposed on the face image FI in such a way that the anatomical feature point included in the face image FI coincides with the anatomical feature point (the second marker point CP-2) shown in the second distribution image DI-2. As a result, the facial expression of the performer US becomes close to the facial expression of the performer US when the face model BM is generated. As a result, the face model BM is accurately positioned with respect to the face image FI.

The second distribution image DI-2 includes a plurality of second AR markers AM-2 indicating the positions of the second marker point group CPG-2. The worker WK places the second marker MK-2 on the face of the performer US while referring to the position of the second AR marker AM-2 superimposed on the face image FI.

Each time the second marker MK-2 is placed on the face of the performer US based on the second distribution image DI-2, the fitting unit 13 performs fitting by using the position information of the placed second marker MK-2. The fitting unit 13 adjusts the superimposed position of the second distribution image DI-2 superimposed on the face image FI based on the fitting result.

[8-3. Marker Arrangement in Third Marker Point Group]

After the markers MK (the first marker MK-1 and the second marker MK-2) are placed for all the marker points CP (the first marker point CP-1 and the second marker point CP-2) included in the first marker point group CPG-1 and the second marker point group CPG-2, placement of the third marker MK-3 in the third marker point group CPG-3 having the third highest priority of fitting is started.

The display control unit 14 displays a third distribution image DI-3 indicating distribution of the third marker point group CPG-3 in a superimposed manner on the face image FI based on the result of fitting using the position information of all the placed markers MK (the first marker MK-1 and the second marker MK-2).

The third distribution image DI-3 includes a plurality of third AR markers AM-3 indicating the positions of the third marker point group CPG-3. The worker WK places the third marker MK-3 on the face of the performer US while referring to the position of the third AR marker AM-3 superimposed on the face image FI.

Each time the third marker MK-3 is placed on the face of the performer US based on the third distribution image DI-3, the fitting unit 13 performs fitting by using the position information of the placed third marker MK-3. The fitting unit 13 adjusts the superimposed position of the third distribution image DI-3 superimposed on the face image FI based on the fitting result.

The position of the third marker point CP-3 is likely to change by the facial expression. However, the facial expression of the performer US becomes close to the face model BM as a result of adjusting the position of the jaw based on the position of the second marker point CP-2. Therefore, the position of the third marker point CP-3 superimposed on the face image FI accurately reflects the position defined in the face model BM. Therefore, the worker WK can place the third marker MK-3 at a substantially accurate position.

The third marker point group CPG-3 is generally uniformly distributed on the front and side surfaces of the face. Immediately after completion of the marker placement work in the second marker point group CPG-2, the face of the performer US faces the front with respect to the camera 20. Therefore, the display control unit 14 first superimposes the third distribution image DI-3 corresponding to a front portion of the face on the face image FI (see the left side of FIG. 15). The worker WK places the third marker MK-3 on the front portion of the face while referring to the third distribution image DI-3.

When the placement of the third marker MK-3 on the front portion of the face is completed, the performer US turns the face to the left side (see the center of FIG. 15). The fitting unit 13 performs fitting by using the position information of the placed marker MK (the first marker MK-1, the second marker MK-2, or the third marker MK-3) shown in the camera 20. The larger the number of markers MK shown in the camera 20, the higher the accuracy of fitting. The turning of the face is appropriately set based on the accuracy of fitting.

The display control unit 14 generates the third distribution image DI-3 according to the face orientation based on the fitting result, and superimposes the third distribution image DI on the face image FI. The worker WK newly places the third marker MK-3 on the left side of the face while referring to the third distribution image DI-3. Thereafter, the change of the face orientation and the placement work for the third marker MK-3 are repeated until the third markers MK-3 are placed on the entire left side of the face.

When the placement of the third marker MK-3 on the left side of the face is completed, the performer US turns the face to the right side (see the right side of FIG. 15). Then, the third markers MK-3 are placed on the entire right side of the face in the same manner as that for the third markers MK-3 placed on the left side of the face.

9. Outlier Detection

In a case where fitting is repeated while the marker MK is placed, the fitting may not be successful due to deviation in the placement position of the marker MK, a change in facial expression at the time of placement, or the like. This problem is likely to occur when the third marker MK-3 is placed in the third marker point group CPG-3 whose position greatly changes by the facial expression. The cause is that the position of the marker MK (y') as an input is incorrect. Therefore, the fitting unit 13 can perform fitting based on the following Formula 4. Formula 4 is obtained by adding a Tukey loss function (Formula 5) to Formula 3. As a result, even if there is an outlier, alignment is performed robustly.

$$\min_{R,t}\left(w_M * \sum_{i=0}^{M}\rho(\|y_i' - K(RX_i' + t)\|^2) + \right.$$

$$\left. w_L * \sum_{i=0}^{L}\|y_i - K(RX_i + t)\|^2\right)$$

Formula 4

-continued $$\rho(r) = \begin{cases} \dfrac{c^2}{6}\left[1-\left(1-\left(\dfrac{r}{c}\right)^2\right)^3\right] & \text{if } |r| < c \\ \dfrac{c^2}{6} & \text{otherwise} \end{cases}$$

Formula 5

Figure 17:
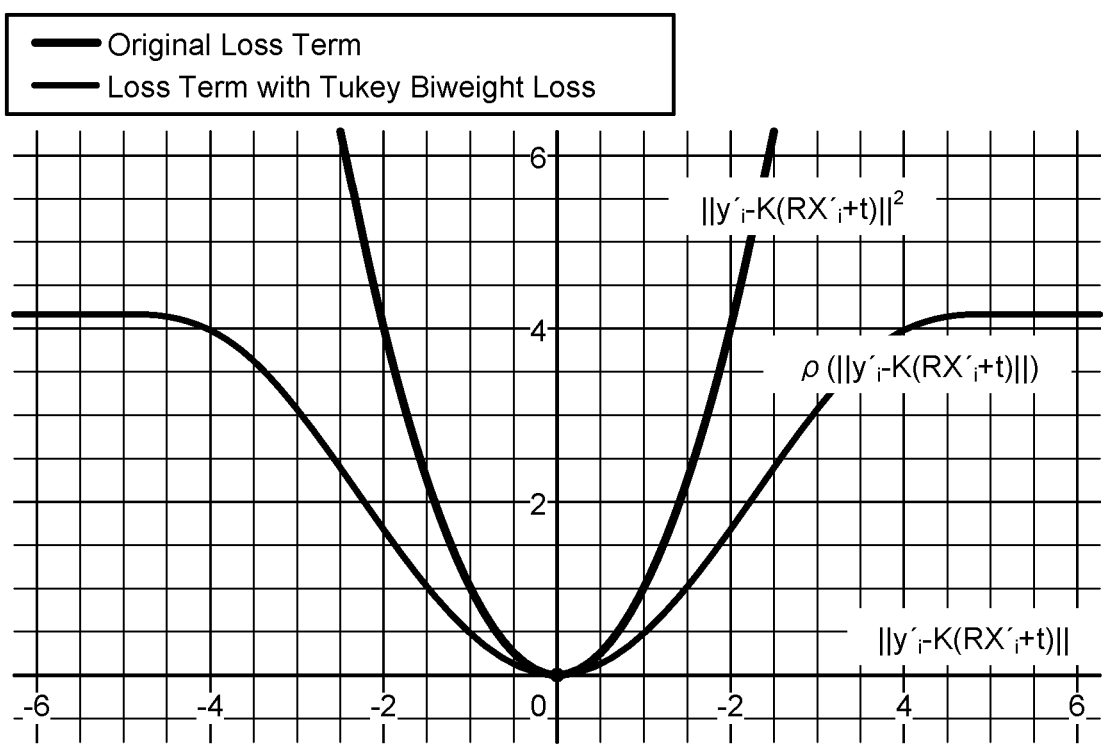
FIG. 17 is a graph of Formulas 3 and 4.

FIG. 17 is a graph of Formulas 3 and 4. Formula 3 is expressed as an "original loss term". Formula 4 is expressed as a "loss term with Turkey biweight loss". By using the Tukey loss function, the outlier is removed from the minimization problem of Formula 3, and fitting is performed based on a correct point.

Formula 3 minimizes a distance (projection distance) between a point $y_i'$ of the face image FI and a point obtained by projecting the point X' of the face model BM onto the face image FI. By using the cost function of Formula 3, the minimization problem is influenced by the outlier ($y_i'$ is incorrect). When the Tukey loss function is integrated, the projection distance is removed from the minimization problem when the projection distance becomes larger than a predetermined distance. Therefore, robustness against an outlier is enhanced. In the graph of FIG. 17, Formula 4 is plotted with c=5 (constant distance). The Tukey loss function is described in the following [3].

[3] V. Belagiannis, C. Rupprecht, G. Carneiro and N. Navab, "Robust Optimization for Deep Regression," in International Conference on Computer Vision (ICCV), 2015

For outlier detection, a method such as RANSAC can be used in combination with Formula 2. RANSAC is described in the following [4].

[4] D. Nister, "Preemptive RANSAC for live structure and motion estimation," in International Conference on Computer Vision (ICCV), Nice, France, 2005

Figure 18:
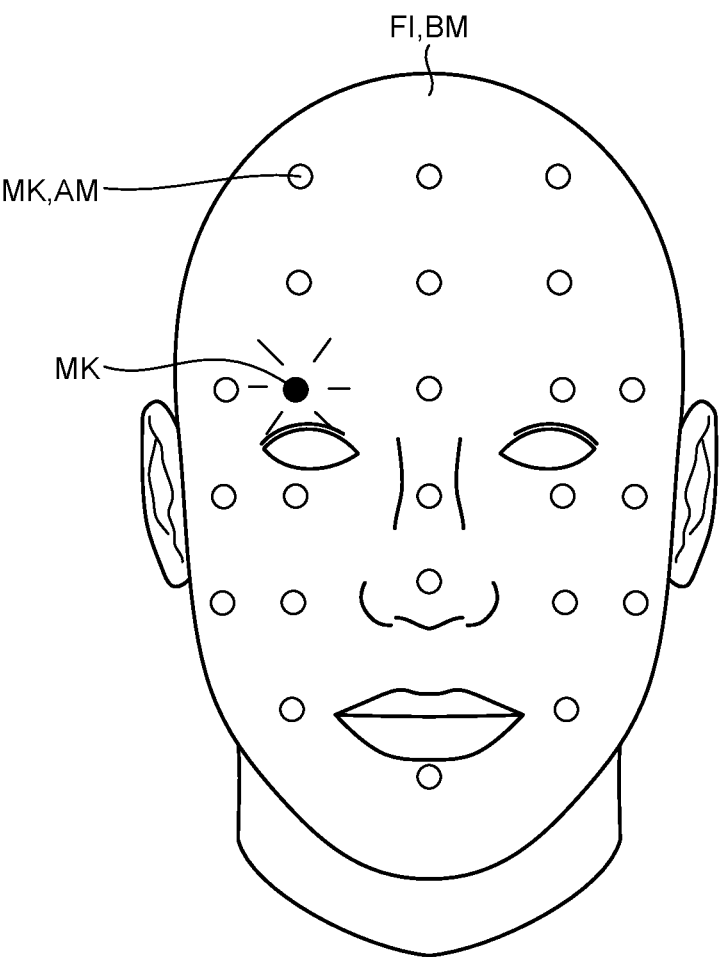
FIG. 18 is a view illustrating an example of an outlier notification method.

FIG. 18 is a view illustrating an example of an outlier notification method.

The display control unit 14 notifies the worker WK of the marker MK whose deviation from the position of the marker point CP (the display position of the AR marker AM) indicated by the distribution image DI exceeds an allowable criterion. The allowable criterion is set based on the accuracy required for facial expression detection. For example, in a case where a distance between the position of the marker point CP indicated by the distribution image DI and the position of the marker MK placed by the worker WK is larger than a preset threshold value, the marker tracking unit 12 determines that the deviation exceeds the allowable criterion. For example, the display control unit 14 controls the AR marker AM corresponding to the marker MK whose deviation exceeds the allowable criterion to blink. Accordingly, attention is attracted to the outlier.

10. Effects

The processing apparatus 10 includes the display control unit 14 and the fitting unit 13. The display control unit 14 displays the distribution image DI of the marker points CP in a superimposed manner on the face image FI of the performer US. The distribution image DI indicates the distribution of the plurality of marker points CP extracted from the face model BM of the performer US. Each time the marker MK is placed on the face of the performer US after the distribution image DI is superimposed, the fitting unit 13 fits the face model BM to the face image FI by using the position information of the placed marker MK. The fitting unit 13 adjusts the superimposed position of the distribution image DI based on the fitting result. In an information processing method according to the present disclosure, the processing in the processing apparatus 10 is executed by a computer. The program 49 according to the present disclosure causes the computer to implement the processing in the processing apparatus 10.

With this configuration, the distribution image DI can be accurately superimposed on the face model BM. Therefore, the accuracy of the placement position of the marker MK is enhanced.

The face model BM includes the position information of the plurality of marker point groups CPG having different priorities of fitting. The display control unit 14 sequentially displays the distribution images DI from the distribution image DI indicating the positions of the marker point group CPG having a high priority.

With this configuration, the distribution image DI of the plurality of marker point groups CPG is displayed in stages according to the priority of fitting. Appropriate fitting is performed by placing the marker MK in each marker point group CPG according to the display order of the distribution image DI.

The marker point group CPG whose positions hardly change by the facial expression has a higher priority of fitting.

With this configuration, the marker MK is first placed in the marker point group CPG whose positions hardly change by the facial expression. When fitting is performed using the position information of the marker MK, the distribution image DI is easily superimposed at an appropriate position on the face image FI even if the facial expression of the performer US deviates from the facial expression of the face model BM.

The fitting unit 13 performs fitting by using the position information of the plurality of landmarks L1 extracted from the face image FI. The fitting unit 13 sets a superimposed position of a first distribution image DI-1 indicating distribution of the first marker point group CPG-1 having the highest priority based on the fitting result.

With this configuration, the first distribution image DI-1 is superimposed at an appropriate position on the face image FI based on the position information of the landmark L1.

The first marker point group CPG-1 includes one or more anatomical feature points existing in the portion of the face other than the jaw.

With this configuration, even in a case where the position of the jaw deviates from the facial expression of the face model BM, the face image FI and the face model BM are accurately fitted. In addition, since the fitting is based on the position information of the landmark L1, even when the superimposed position of the first distribution image DI-1 is not accurately set, the performer US can place the marker MK at an appropriate portion of the face based on the morphological feature of the anatomical feature point. Therefore, the marker MK is accurately placed at the portion of the face that corresponds to the first marker point group CPG-1.

Each time the marker MK is placed on the face of the performer US based on the first distribution image DI-1, the fitting unit 13 performs fitting by using the position information of the placed marker MK and the position information of the plurality of landmarks L1. The fitting unit 13 adjusts the superimposed position of the first distribution image DI-1 based on the fitting result.

With this configuration, the superimposed position of the first distribution image DI-1 is appropriately adjusted based on the position information of the placed marker MK and the position information of the landmark L1.

The fitting unit 13 increases the contribution of the position information of the marker MK to the fitting as the number of placed markers MK increases.

With this configuration, the accuracy of fitting increases as the number of placed markers MK increases.

The display control unit 14 displays the second distribution image DI-2 indicating the distribution of the second marker point group CPG-2 having the second highest priority in a superimposed manner on the face image FI based on a result of fitting using the position information of all the placed markers MK after the markers MK are placed for all the marker points CP included in the first marker point group CPG-1.

With this configuration, the second distribution image DI-2 is superimposed at an appropriate position on the face image FI based on the position information of the marker MK.

A second marker point group CPG-2 includes one or more anatomical feature points existing in the jaw.

With this configuration, the performer US can easily match the facial expression of the face with the facial expression of the face model BM based on the position of the anatomical feature point. As the facial expression of the face becomes close to the facial expression of the face model BM, the marker placement position (the display position of the second AR marker AM-2) suggested by the second distribution image DI-2 is optimized.

The display control unit 14 displays the face model BM fitted to the face image FI in a superimposed manner on the face image FI together with the second distribution image DI-2.

With this configuration, the performer US can easily match the facial expression of the face with the facial expression of the face model BM.

Each time the marker MK is placed on the face of the performer US based on the second distribution image DI-2, the fitting unit 13 performs fitting by using the position information of the placed marker MK. The fitting unit 13 adjusts the superimposed position of the second distribution image DI-2 based on the fitting result.

With this configuration, the superimposed position of the second distribution image DI-2 is appropriately adjusted based on the position information of the placed marker MK.

The display control unit 14 displays the third distribution image DI-3 indicating the distribution of the third marker point group CPG-3 having the third highest priority in a superimposed manner on the face image FI based on a result of fitting using the position information of all the placed markers MK after the markers MK are placed for all the marker points CP included in the first marker point group CPG-1 and the second marker point group CPG-2.

With this configuration, the third distribution image DI-3 is superimposed at an appropriate position on the face image FI based on the position information of the marker MK.

Each time the marker MK is placed on the face of the performer US based on the third distribution image DI-3, the fitting unit 13 performs fitting by using the position information of the placed marker MK. The fitting unit 13 adjusts the superimposed position of the third distribution image DI-3 based on the fitting result.

With this configuration, the superimposed position of the third distribution image DI-3 is appropriately adjusted based on the position information of the placed marker MK.

The display control unit 14 notifies of the marker MK whose deviation from the position of the marker point CP indicated by the distribution image DI exceeds an allowable criterion.

With this configuration, the performer US can be urged to adjust the position of the displaced marker MK.

Note that the effects described in the present specification are merely examples. The effects of the present disclosure are not limited thereto, and other effects may be obtained.

11. Modified Example

In the above embodiment, an example in which the number of cameras 20 that captures the face image FI of the performer US is one has been described. However, the number of cameras 20 is not limited to one. The face image FI of the performer US may be captured in a plurality of directions by a plurality of cameras 20. For example, the fitting may be performed using the face images FI captured from the front side, the left diagonal side, and the right diagonal side of the performer US. In this case, it is not necessary for the performer US to change the orientation of the face as illustrated in FIG. 15. Therefore, all the third AR markers AM-3 can be simultaneously displayed.

In the above embodiment, an example in which the number of face models BM to be fitted is one has been described. However, the number of face models BM is not limited to one. The face model BM to be fitted can be selectively used according to the state of the face of the performer US during the marker placement work. For example, when the marker MK is placed near the eye, the performer US may close the eye. In this case, the fitting is preferably performed based on the face model BM in a state where the eyes are closed. In other marker placement work, the performer US can open the eyes. When the performer US has the eyes open, the fitting is performed based on the face model BM in a state where the eyes are opened.

SUPPLEMENTARY NOTE

Note that the present technology can also have the following configurations.

(1)

An information processing apparatus comprising:

a display control unit that displays a distribution image indicating distribution of a plurality of marker points extracted from a face model of a performer in a superimposed manner on a face image of the performer; and a fitting unit that fits the face model to the face image by using position information of a placed marker each time the marker is placed on a face of the performer after the distribution image is superimposed, and adjusts a superimposed position of the distribution image based on a fitting result.

(2)

The information processing apparatus according to (1), wherein the face model includes position information of a plurality of marker point groups having different priorities of fitting, and the display control unit displays the distribution images in order from the distribution image indicating a position of the marker point group having a high priority.

(3)

The information processing apparatus according to (2), wherein the marker point group whose positions hardly change by a facial expression has a higher priority.

(4)

The information processing apparatus according to (2) or (3), wherein the fitting unit performs the fitting by using position information of a plurality of landmarks extracted from the face image, and sets a superimposed position of a first distribution image indicating distribution of a first marker point group having a highest priority based on a fitting result.

(5)

The information processing apparatus according to (4), wherein the first marker point group includes one or more anatomical feature points existing in a portion of the face other than a jaw.

(6)

The information processing apparatus according to (4) or (5), wherein the fitting unit performs the fitting by using the position information of the placed marker and the position information of the plurality of landmarks each time the marker is placed on the face of the performer based on the first distribution image, and adjusts the superimposed position of the first distribution image based on a fitting result.

(7)

The information processing apparatus according to (6), wherein the fitting unit increases contribution of the position information of the marker to the fitting as the number of placed markers increases.

(8)

The information processing apparatus according to any one of (4) to (7), wherein the display control unit displays a second distribution image indicating distribution of a second marker point group having a second highest priority in a superimposed manner on the face image based on a result of fitting using position information of all the placed markers after the markers are placed for all the marker points included in the first marker point group.

(9)

The information processing apparatus according to (8), wherein the second marker point group includes one or more anatomical feature points existing in a jaw.

(10)

The information processing apparatus according to (9), wherein the display control unit displays the face model fitted to the face image in a superimposed manner on the face image together with the second distribution image.

(11)

The information processing apparatus according to any one of (8) to (10), wherein the fitting unit performs the fitting by using the position information of the placed marker each time the marker is placed on the face of the performer based on the second distribution image, and adjusts a superimposed position of the second distribution image based on a fitting result.

(12)

The information processing apparatus according to any one of (8) to (11), wherein the display control unit displays a third distribution image indicating distribution of a third marker point group having a third highest priority in a superimposed manner on the face image based on a result of fitting using position information of all the placed markers after the markers are placed for all the marker points included in the first marker point group and the second marker point group.

(13)

The information processing apparatus according to (12), wherein the fitting unit performs the fitting by using the position information of the placed marker each time the marker is placed on the face of the performer based on the third distribution image, and adjusts a superimposed position of the third distribution image based on a fitting result.

(14)

The information processing apparatus according to any one of (1) to (13), wherein the display control unit notifies of the marker whose deviation from a position of the marker point indicated by the distribution image exceeds an allowable criterion.

(15)

An information processing method executed by a computer, the information processing method comprising:
   displaying a distribution image indicating distribution of a plurality of marker points extracted from a face model of a performer in a superimposed manner on a face image of the performer; and
   fitting the face model to the face image by using position information of a placed marker each time the marker is placed on a face of the performer after the distribution image is superimposed, and adjusting a superimposed position of the distribution image based on a fitting result.

(16)

A program causing a computer to implement:
   displaying a distribution image indicating distribution of a plurality of marker points extracted from a face model of a performer in a superimposed manner on a face image of the performer; and
   fitting the face model to the face image by using position information of a placed marker each time the marker is placed on a face of the performer after the distribution image is superimposed, and adjusting a superimposed position of the distribution image based on a fitting result.

REFERENCE SIGNS LIST

10 PROCESSING APPARATUS (INFORMATION PROCESSING APPARATUS)
13 FITTING UNIT
14 DISPLAY CONTROL UNIT
BM FACE MODEL
CP MARKER POINT
CPG MARKER POINT GROUP
CPG-1 FIRST MARKER POINT GROUP
CPG-2 SECOND MARKER POINT GROUP
CPG-3 THIRD MARKER POINT GROUP
DI DISTRIBUTION IMAGE
DI-1 FIRST DISTRIBUTION IMAGE
DI-2 SECOND DISTRIBUTION IMAGE
DI-3 THIRD DISTRIBUTION IMAGE
FI FACE IMAGE
L1 LANDMARK
MK MARKER
US PERFORMER

The invention claimed is:

1. An information processing apparatus, comprising:
   a processor configured to:
      extract distribution of a plurality of marker points from a face model of a performer;
      superimpose a first distribution image on a face image of the performer, wherein the first distribution image indicates the extracted distribution of the plurality of marker points;
      display the superimposed first distribution image;
      fit the face model to the face image of the performer, based on first position information of a first marker placed on a face of the performer, wherein the face model is fitted to provide a first fitted face model, and
      the first marker is placed on the face of the performer subsequent to the display of the superimposed first distribution image; and
      adjust a position of the superimposed first distribution image based on the first fitted face model.

2. The information processing apparatus according to claim 1, wherein
   the face model includes second position information of each of a plurality of marker point groups,
   one marker point group of the plurality of marker point groups include the plurality of marker points,
   each of the plurality of marker point groups includes a priority to fit the face model,
   the priority of each of the plurality of marker point groups is different,
   the processor is further configured to display a plurality of distribution images including the first distribution image,
   each of the plurality of distribution images indicates the second position information of a respective marker point group of the plurality of marker point groups,
   each of the plurality of distribution images is associated with the priority of the respective marker point group,
   a plurality of priorities includes the priority of each of the plurality of marker point groups, and
   the plurality of distribution images is displayed in a descending order of the plurality of priorities associated with the plurality of distribution images.

3. The information processing apparatus according to claim 2, wherein
   a first change associated with the second position information of a first marker point group of the plurality of marker point groups is least among a plurality of changes associated with the second position information of the plurality of marker point groups,
   the plurality of changes associated with the second position information of the plurality of marker point groups are via a facial expression of the performer, and
   the priority of the first marker point group is highest among the plurality of priorities.

4. The information processing apparatus according to claim 2, wherein the processor is further configured to:
   extract position information of each of a plurality of landmarks from the face image; and
   fit the face model based on the extracted third position information of each of the plurality of landmarks, wherein
      the first distribution image indicates distribution of a first marker point group of the plurality of marker point groups,
      the first marker point group includes the plurality of marker points, and
      the priority of the first marker point group is higher among the plurality of priorities.

5. The information processing apparatus according to claim 4, wherein
   the first marker point group includes at least one or more anatomical feature point,
   the at least one anatomical feature point is in a portion of the face, and
   the portion of the face exclude a jaw of the performer.

6. The information processing apparatus according to claim 4, wherein the processor is further configured to:

fit the face model, via the first position information and the extracted third position information, to provide a second fitted face model; and adjust the position of the superimposed first distribution image based on the second fitted face model.

7. The information processing apparatus according to claim 6, wherein the processor is further configured to increase contribution of the first position information of the first marker based on a plurality of markers, the plurality of markers includes the first marker, and the plurality of markers is placed on the face of the performer.

8. The information processing apparatus according to claim 4, wherein the processor is further configured to:

fit the face model, via a plurality of first position information of a plurality of first markers, to provide a second fitted face model, wherein the plurality of first position information includes the first position information, the plurality of first markers is placed on the face of the performer, the plurality of first markers includes the first marker, and the plurality of first markers is associated with the plurality of marker points;

superimpose a second distribution image of the plurality of distribution images on the face image of the performer, wherein the second distribution image is superimposed based on the second fitted face model, the second distribution image indicates distribution of a second marker point group, and the priority of the second marker point group is highest among the plurality of priorities except the priority of the first marker point group; and display the superimposed second distribution image.

9. The information processing apparatus according to claim 8, wherein the second marker point group includes at least one anatomical feature point on a jaw of the performer.

10. The information processing apparatus according to claim 9, wherein the processor is further configured to:

superimpose the second fitted face model on the face image; and display the superimposed second fitted face model along with the superimposed second distribution image.

11. The information processing apparatus according to claim 8, wherein the processor is further configured to:

fit the face model, via fourth position information of a second marker, to provide a third fitted face model, wherein the second marker is on the face of the performer, and the third fitted face model is provided subsequent to the display of the superimposed second distribution image; and adjust a position of the superimposed second distribution image based on the third fitted face model.

12. The information processing apparatus according to claim 8, wherein the processor is further configured to:

fit the face model, via a plurality of fifth position information of a plurality of second markers, to provide a third fitted face model, wherein the second marker point group includes a plurality of second marker points, the plurality of second markers is associated with the plurality of second marker points, and the plurality of second markers is placed on the face of the performer, superimpose a third distribution image of the plurality of distribution images on the face image of the performer, wherein the third distribution image is superimposed based on the third fitted face model, the third distribution image indicates distribution of a third marker point group, and the priority of the third marker point group is highest among the plurality of priorities except the priority of the first marker point group and the priority of the second marker point group; and display the superimposed third distribution image.

13. The information processing apparatus according to claim 12, wherein the processor is further configured to:

fit the face model, via sixth position information of a third marker, to provide a fourth fitted face model, wherein the third marker is placed on the face of the performer, and the fourth fitted face model is provided subsequent to the display of the superimposed third distribution image; and adjust a seventh position of the superimposed third distribution image based on the fourth fitted face model.

14. The information processing apparatus according to claim 1, wherein the processor is further configured to:

determine that a distance between a position of a second marker and a position of a marker point of the plurality of marker points is greater than a threshold value, wherein the position of the second marker is on the face of the performer, and the second marker is associated with the marker point; and notify of the second marker based on the determination.

15. An information processing method, comprising:

extracting distribution of a plurality of marker points from a face model of a performer;

superimposing a distribution image on a face image of the performer, wherein the distribution image indicates the extracted distribution of the plurality of marker points;

displaying the superimposed distribution image;

fitting the face model to the face image of the performer, based on position information of a marker placed on a face of the performer, wherein the face model is fitted to provide a fitted face model, and the marker is placed on the face of the performer subsequent to the display of the superimposed distribution image; and adjusting a position of the superimposed distribution image based on the fitted face model.

16. A non-transitory computer-readable medium having stored thereon computer-executable instructions, that when executed by a computer, causes the computer to execute operations, the operations comprising:

extracting distribution of a plurality of marker points from a face model of a performer;

superimposing a distribution image on a face image of the performer, wherein the distribution image indicates the extracted distribution of the plurality of marker points;

displaying the superimposed distribution image; and fitting the face model to the face image of the performer, based on position information of a marker placed on a face of the performer, wherein the face model is fitted to provide a fitted face model, and the marker is placed on the face of the performer subsequent to the display of the superimposed distribution image; and adjusting a position of the superimposed distribution image based on the fitted face model.

* * * * *